United States Patent
Nam et al.

(10) Patent No.: US 8,340,199 B2
(45) Date of Patent: Dec. 25, 2012

(54) 8-TRANSMIT ANTENNA REFERENCE SIGNAL DESIGN FOR DOWNLINK COMMUNICATIONS IN A WIRELESS SYSTEM

(75) Inventors: Young-Han Nam, Richardson, TX (US); Jianzhong Zhang, Irving, TX (US); Farooq Khan, Allen, TX (US); Shadi Abu-Surra, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 560 days.

(21) Appl. No.: 12/587,164

(22) Filed: Oct. 2, 2009

(65) Prior Publication Data

US 2010/0104034 A1  Apr. 29, 2010

Related U.S. Application Data

(60) Provisional application No. 61/197,373, filed on Oct. 27, 2008.

(51) Int. Cl.
*H04L 27/28* (2006.01)
*H04B 7/02* (2006.01)

(52) U.S. Cl. ........................ 375/260; 375/267
(58) Field of Classification Search .................. 375/260, 375/267, 299, 347, 349, 355; 700/53; 455/101, 455/132–141
See application file for complete search history.

(56) References Cited

U.S. PATENT DOCUMENTS

| | | | |
|---|---|---|---|
| 2008/0192872 A1 | 8/2008 | Lindoff | |
| 2008/0303699 A1* | 12/2008 | Zhang et al. | 341/67 |
| 2009/0046570 A1* | 2/2009 | Sarkar et al. | 370/203 |
| 2009/0213944 A1* | 8/2009 | Grant | 375/260 |
| 2010/0034299 A1* | 2/2010 | Love et al. | 375/260 |

FOREIGN PATENT DOCUMENTS

| | | |
|---|---|---|
| JP | 2008-199423 | 8/2008 |
| WO | WO 2008/050964 A1 | 5/2008 |
| WO | WO 2008/115588 A2 | 9/2008 |

OTHER PUBLICATIONS

International Search Report dated May 31, 2010 in connection with International Patent Application No. PCT/KR2009/006239.
Written Opinion of the International Searching Authority dated May 31, 2010 in connection with International Patent Application No. PCT/KR2009/006239.

* cited by examiner

*Primary Examiner* — Khanh C Tran

(57) ABSTRACT

Systems and methods are disclosed for mapping reference signals for antenna ports in a plurality of resource blocks among resource blocks in a subframe within an orthogonal frequency division multiplexing (OFDM) communication system. This method includes selecting at least one predetermined resource elements for transmitting in the plurality of resource blocks using a first number of antenna ports. This method also includes selecting a second number of antenna ports and mapping a plurality of reference signals relating to the second number of antenna ports using a second number of OFDM symbols.

20 Claims, 18 Drawing Sheets

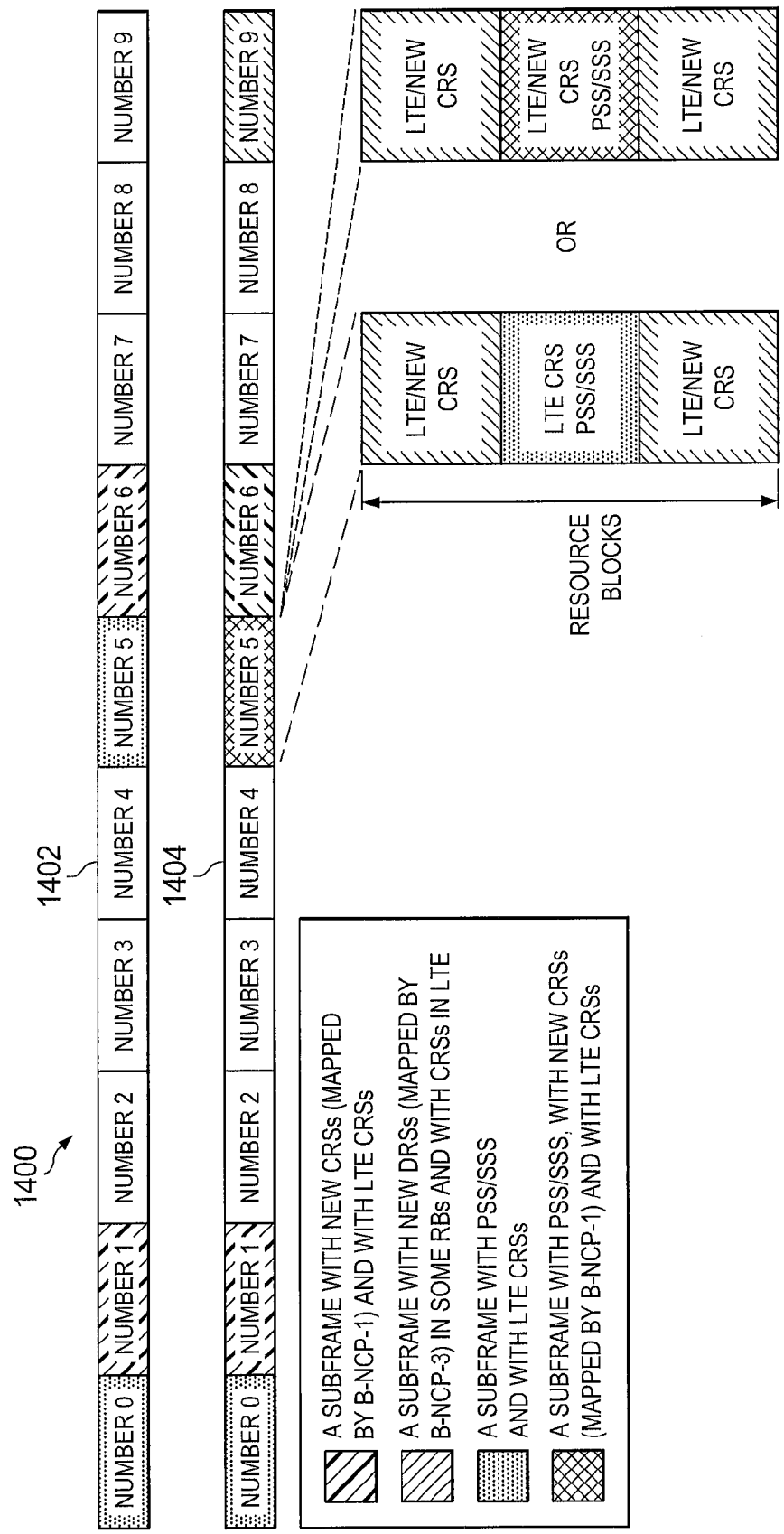

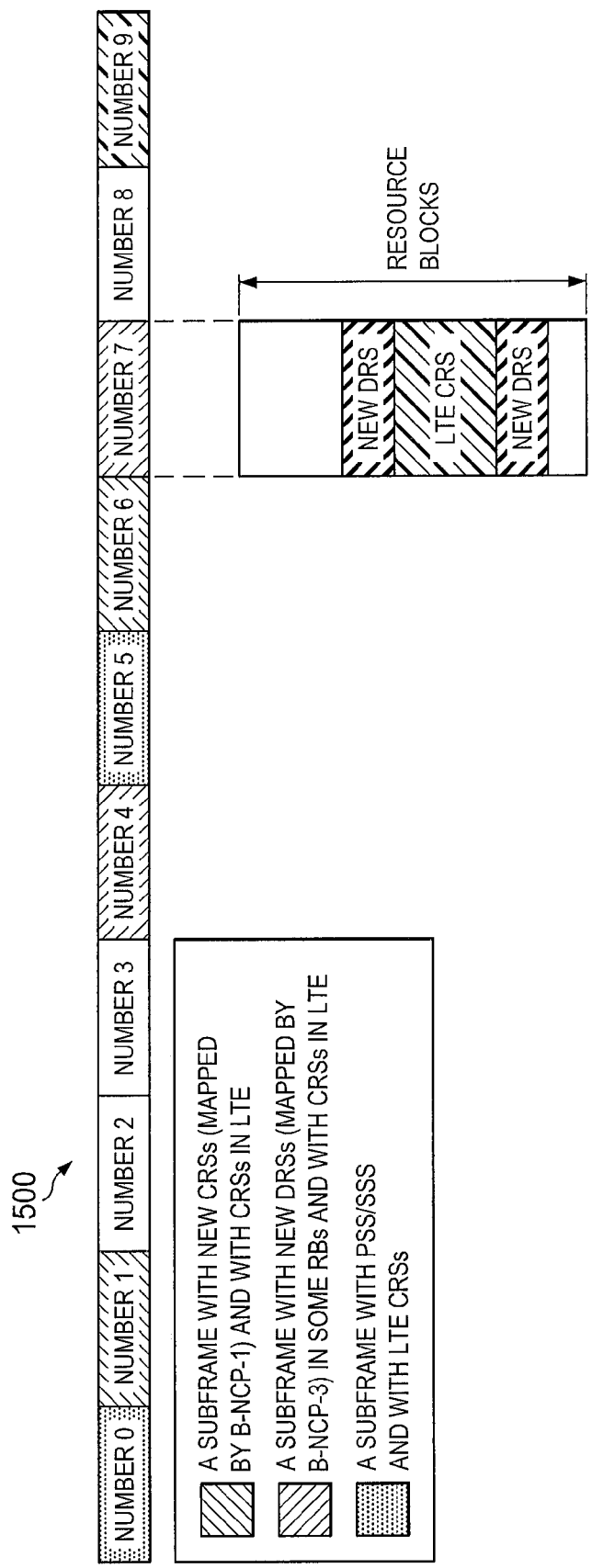

8-TRANSMIT ANTENNA REFERENCE SIGNAL DESIGN FOR DOWNLINK COMMUNICATIONS IN A WIRELESS SYSTEM

CROSS-REFERENCE TO RELATED APPLICATION(S) AND CLAIM OF PRIORITY

The present application is related to U.S. Provisional Patent No. 61/197,373, filed Oct. 27, 2008, entitled "8-TRANSMIT ANTENNA REFERENCE SIGNAL DESIGN FOR DOWNLINK COMMUNICATIONS IN A WIRELESS SYSTEM". Provisional Patent No. 61/197,373 is assigned to the assignee of the present application and is hereby incorporated by reference into the present application as if fully set forth herein. The present application hereby claims priority under 35 U.S.C. §119(e) to U.S. Provisional Patent No. 61/197,373.

TECHNICAL FIELD OF THE INVENTION

The present application relates generally to wireless communications and, more specifically, to reference signal design used by various communication schemes.

BACKGROUND OF THE INVENTION

Wireless cellular communication networks can comprise a plurality of mobile user equipment (UE) devices and a number of base stations (BS). A base station is generally a fixed station, and may also be called a base transceiver system (BTS), an access point (AP), a node base (NodeB), or some other equivalent terminology. As improvements of networks are made, the NodeB functionality evolves, so a NodeB is sometimes also referred to as an enhanced, or evolved, NodeB (eNB). In general, NodeB hardware, when deployed, is fixed and stationary, while the UE hardware is portable.

The mobile UE can comprise portable hardware. The mobile UE, also referred to as a terminal or a mobile station, may be fixed or mobile device and may be a wireless device, a cellular phone, a personal digital assistant (PDA), a wireless modem card, and so on. The phrase "Uplink communication" (UL) can be used to refer to a communication from the mobile UE to the NodeB. The phrase "downlink communication" (DL) can be used to refer to communication from the NodeB to the mobile UE. Each base station contains at least one radio frequency transmitter and at least one receiver used to communicate directly with mobile UEs. Similarly, each mobile UE contains at least one radio frequency transmitter and at least one receiver used to communicate directly with the NodeB. In some cellular networks, the mobiles cannot communicate directly with each other but have to communicate with the NodeB.

A reference signal (RS) is a pre-defined signal known to both transmitter and receiver. The RS is typically transmitted in order for the receiver to estimate the signal propagation medium. This process is also known as "channel estimation." Thus, an RS can be transmitted to facilitate channel estimation. Upon deriving channel estimates they are used for demodulation of transmitted information. This type of RS is sometimes referred to as De-Modulation RS or DM RS. The RS can also be transmitted for other purposes, such as channel sounding (SRS), synchronization, channel state information (CSI) measurement, channel quality information (CQI) measurement, or any other purposes. The Reference Signal (RS) can be sometimes called the pilot signal, training signal, or any other equivalent term.

As the number of antenna continues to increase in wireless technology, the complexity in transmitting RS signals has increased. There needs to be improved systems and methods to transmit RS signals.

SUMMARY OF THE INVENTION

In one embodiment, a method of mapping reference signals for antenna ports in a plurality of resource blocks among resource blocks in a subframe within an orthogonal frequency division multiplexing (OFDM) communication system is disclosed. This method includes selecting at least one predetermined resource elements for transmitting in the plurality of resource blocks using a first number of antenna ports. The first number of antenna ports are used to transmit a first number of reference signals using at least one predetermined mapping scheme, and in this method the at least one predetermined resource elements comprise a first number of OFDM symbols that are transmitted using the first number of antenna ports. This method also includes selecting a second number of antenna ports and mapping a plurality of reference signals relating to the second number of antenna ports using a second number of OFDM symbols. Each of the reference signals for the second number of antenna ports are mapped in one of the resource elements comprising each of the second number of OFDM symbols.

In another embodiment, a system is disclosed that includes a processor that maps additional reference signals for a second number of antenna ports in a plurality of resource blocks among the resource blocks in a subframe within an orthogonal frequency division multiplexing (OFDM) communication system. The processor is further configured to select at least one predetermined resource element for transmitting in the plurality of resource blocks using a first number of antenna ports. The first number of antenna ports are used to transmit a first number of reference signals using at least one predetermined mapping scheme. The at least one predetermined resource element comprises a first number of OFDM symbols that are transmitted using the first number of antenna ports. The processor is also configured to select a second number of antenna ports and map a plurality of references signal relating to the second number of antenna ports using a second number of OFDM symbols. The reference signals for the second number of antenna ports are mapped in the resource elements comprising each of the second number of OFDM symbols of each of the plurality of resource blocks. This system also includes a transmitter that transmits the signals created by the processor over the plurality of antenna ports.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 14 is an example of mapping sets of CRSs according to an exemplary embodiment of the disclosure;

FIG. 15 is an example of mapping sets of CRSs and DRS according to an exemplary embodiment of the disclosure;

DETAILED DESCRIPTION OF THE INVENTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged way to transmit reference signals in a communications scheme, including a wireless communications scheme.

Aspects, features, and advantages of the invention are readily apparent from the following detailed description, simply by illustrating a number of particular embodiments and implementations, including the best mode contemplated for carrying out the invention. The invention is also capable of other and different embodiments, and it has several details that can be modified in various obvious respects, all without departing from the spirit and scope of the invention. Accordingly, the drawings and description are to be regarded as illustrative in nature, and not as restrictive.

Figure 1:
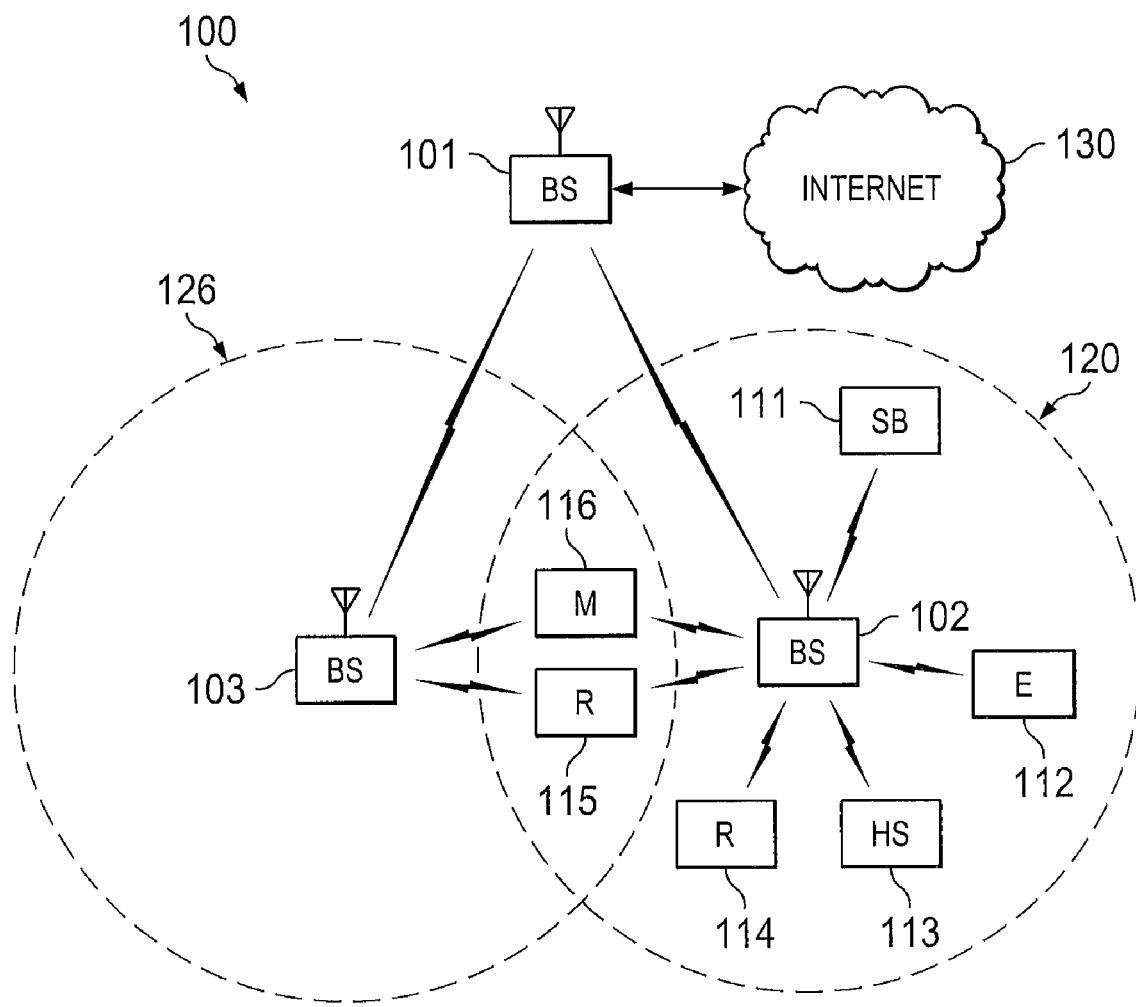
FIG. 1 illustrates an exemplary wireless network that transmits ACK/NACK messages in the uplink according to the principles of the present disclosure.

FIG. 1 illustrates an exemplary wireless network 100, which transmits ACK/HACK messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown). Any type or configuration of base stations, including, but not limited to E-node B base stations used in third generation wireless standards, may be used with the present systems and methods.

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
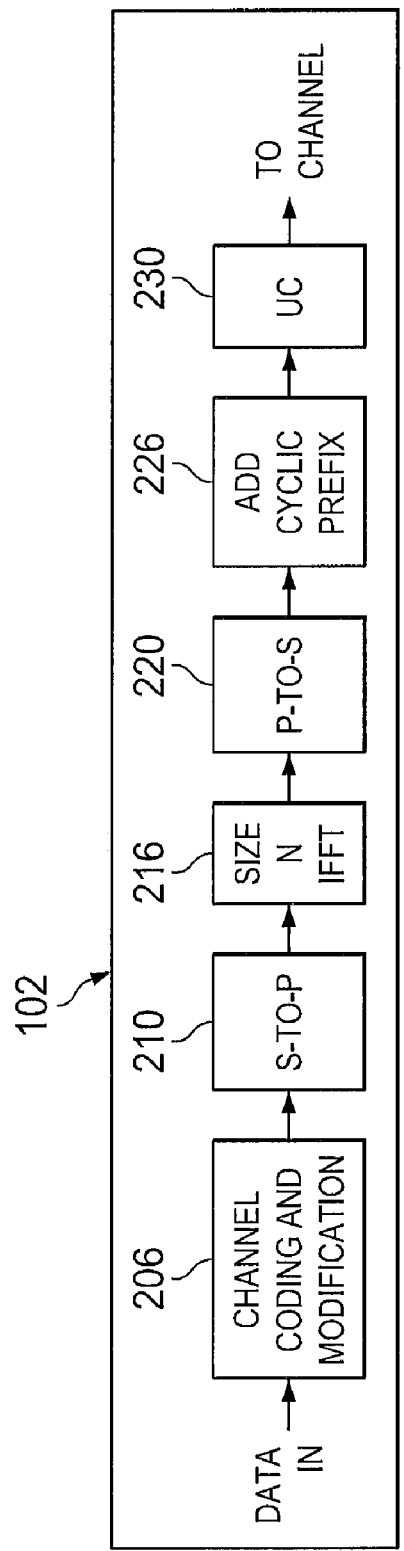
FIG. 2A is a high-level diagram of an OFDMA transmitter according to one embodiment of the present disclosure.
Figure 2B:
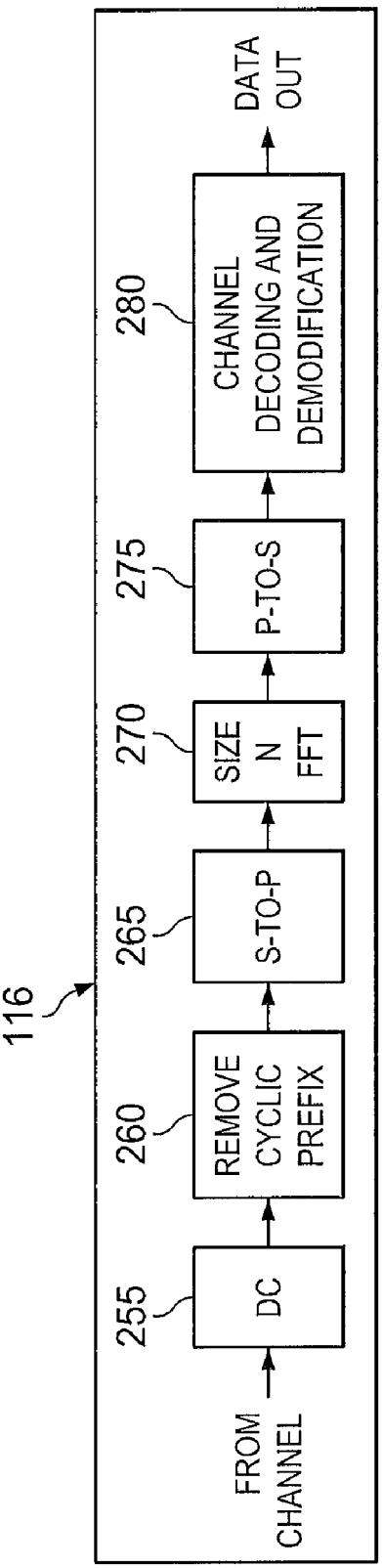
FIG. 2B is a high-level diagram of an OFDMA receiver according to one embodiment of the present disclosure.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 206, serial-to-parallel (S-to-P) block 210, Size N Inverse Fast Fourier Transform (IFFT) block 216, parallel-to-serial (P-to-S) block 220, add cyclic prefix block 226, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is byway of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 206 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 216 then performs an IFFT operation on the N parallel symbol streams to produce time-domain output signals. Parallel-to-serial block 220 converts (i.e., multiplexes) the parallel time-domain output symbols from Size N IFFT block 216 to produce a serial time-domain signal. Add cyclic prefix block 226 then inserts a cyclic prefix to the time-domain signal. Finally, up-converter 230 modulates (i.e., up-converts) the output of add cyclic prefix block 226 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

Figure 3:
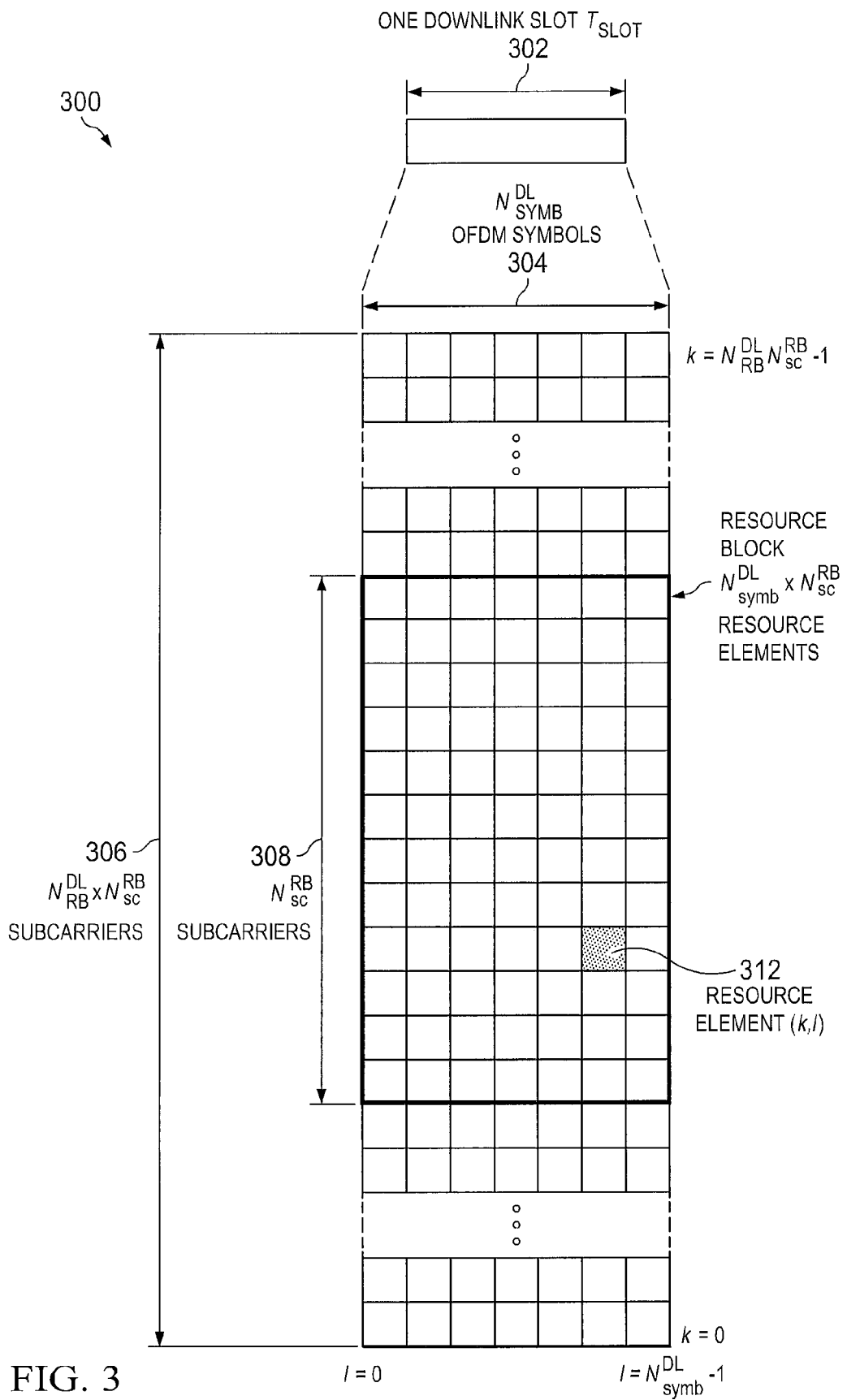
FIG. 3 illustrates an example of a resource grid according to an exemplary embodiment of the disclosure.

The transmitted signal in each slot is described by a resource grid 300 of $N_{RB}^{DL}N_{sc}^{RB}$ subcarriers 306 and $N_{symb}^{DL}$ OFDM symbols 304 within a download slot $T_{slot}$ 302. The resource grid structure is illustrated in FIG. 3. The quantity $N_{RB}^{DL}$ depends on the downlink transmission bandwidth conFIGUREd in the cell and shall fulfill Equation 1.

$$N_{RB}^{min,DL} \leq N_{RB}^{DL} \leq N_{RB}^{max,DL} \quad [\text{Eqn. 1}]$$

where $N_{RB}^{min,DL}=6$ and $N_{RB}^{max,DL}=110$ are the examples of the smallest and largest downlink bandwidth. It is understood that specifications may support values that are both higher and lower than those indicated above.

In case of multi-antenna transmission, there is one resource grid defined per antenna port.

Each element in the resource grid for antenna port p is called a resource element and is uniquely identified by the index pair (k,l) in a slot where $k=0, \ldots, N_{RB}^{DL}N_{sc}^{RB}-1$ and $l=0, \ldots, N_{symb}^{DL}-1$ are the indices in the frequency and time domains, respectively. Resource element (k,l) 312 on antenna port p corresponds to the complex value $\alpha_{k,l}^{(p)}$. It is understood that in certain situations, such as where there is no risk for confusion, or no particular antenna port is specified, the index p may be dropped.

In long term evolution (LTE), DL reference signals (RSs) are used for two purposes: for each UE's measuring channel quality information (CQI), rank information (RI) and precoder matrix information (PMI), and for each UE's demodulating the DL transmission signal intended to itself. In addition, DL RSs are divided into three categories: cell-specific RSs, multi-media broadcast over a single frequency network (MBSFN) RSs and UE-specific RSs, or dedicated RSs (DRSs).

Cell-specific reference signals (or common reference signals: CRSs) are transmitted in all downlink subframes in a cell supporting non-MBSFN transmission. In case the subframe is used for transmission with MBSFN, only the first two OFDM symbols in a subframe can be used for transmission of cell-specific reference symbols.

Figure 4:
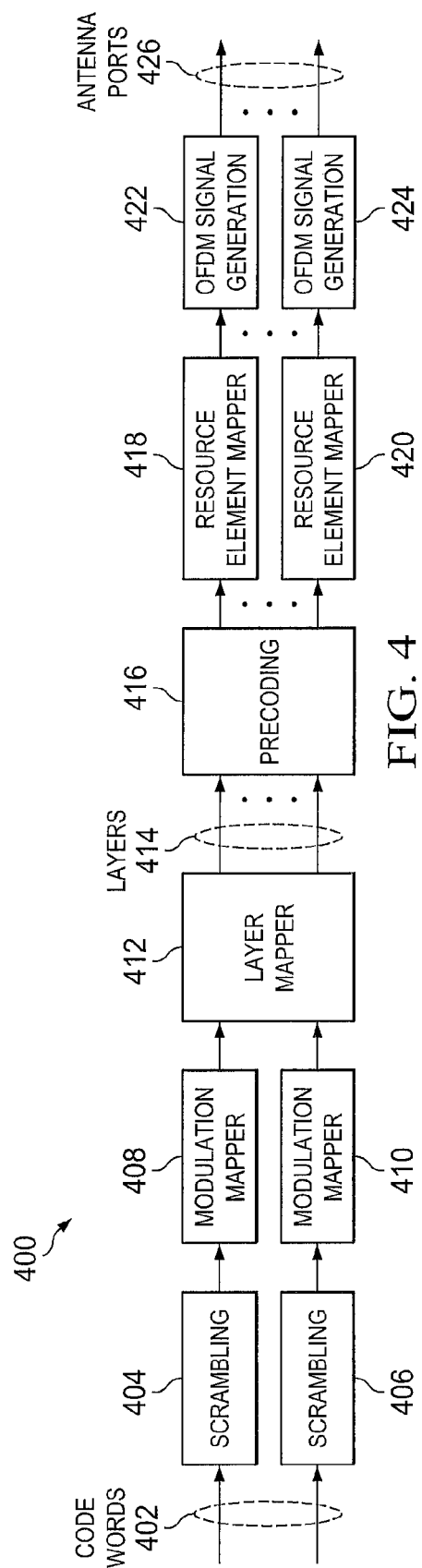
FIG. 4 illustrates an example of a physical channel processing in an LTE system according to an exemplary embodiment of the disclosure.

FIG. 4 is an overview of the physical channel processing in an LTE system. Codewords 402 are selected and transmitted to a first scrambling block 404 and a second scrambling block 406. The first scrambling block 404 sends scrambled information to the modulation mapper block 408. The second scrambling block 406 sends data to the second modulation mapper block 410. The first and second modulation mapper blocks 408 and 410, respectively send data to the layer mapper block 412. The Layer mapper block 412 creates a plurality of layers 414 and sends them to a precoding block 416. The precoding block 415 sends a first layer to the first resource element mapper block 418 and a second layer to a second resource element mapper block 410. The first resource mapper block 418 transmits output to the OFDM signal generation block 422, and the second resource element mapper block 420 transmits data to an OFDM signal generation block 424. The first ODFM signal generator block 422 and the second OFDM signal generation block 424 transmit data to antenna ports block 426.

Figure 5A:
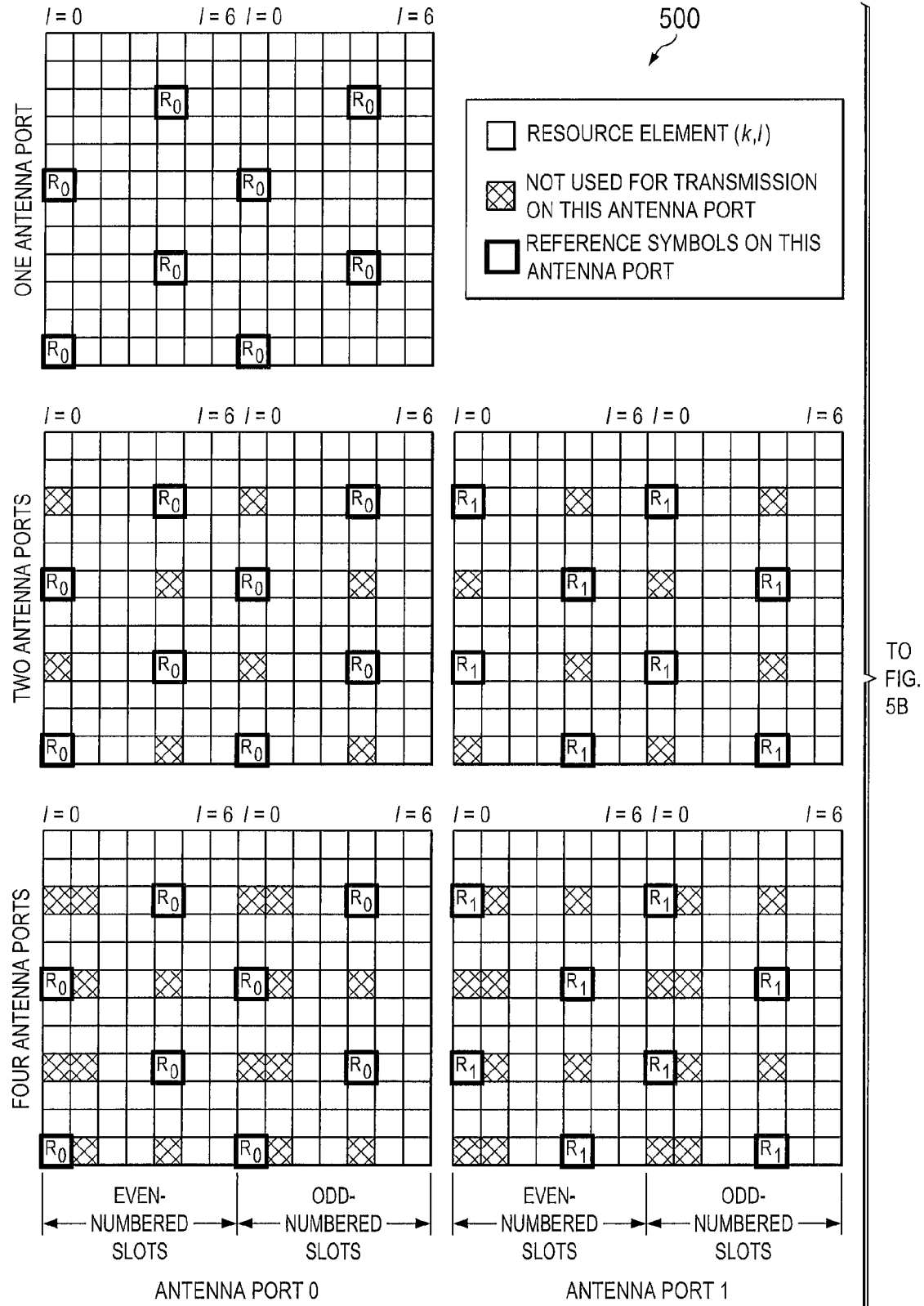
FIG. 5 illustrates the resource elements used for reference signal transmission according to an exemplary embodiment of the disclosure.
Figure 5B:
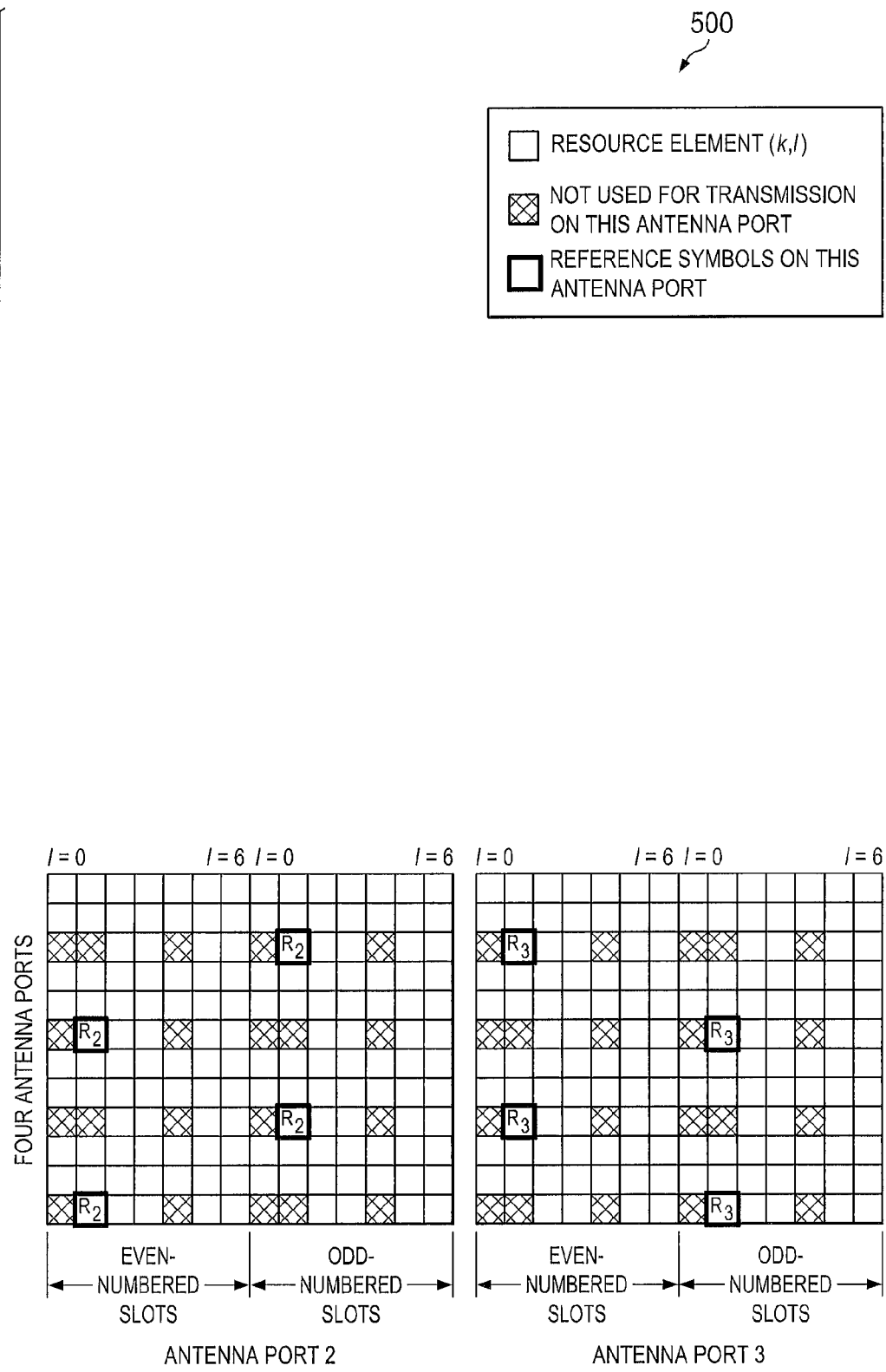
Figure 6A:
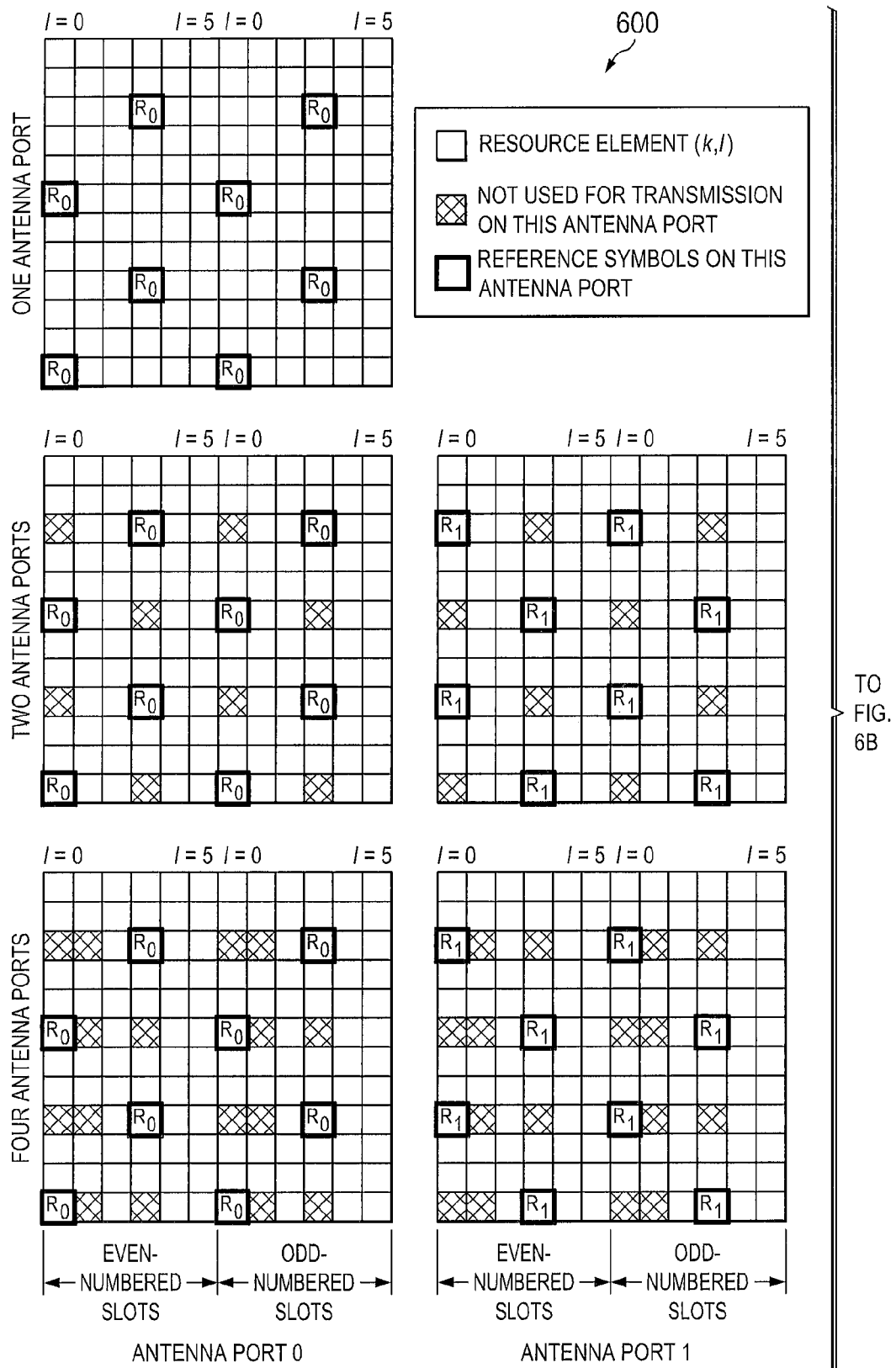
FIG. 6 illustrates the resource elements used for reference signal transmission according to another exemplary embodiment of the disclosure.
Figure 6B:
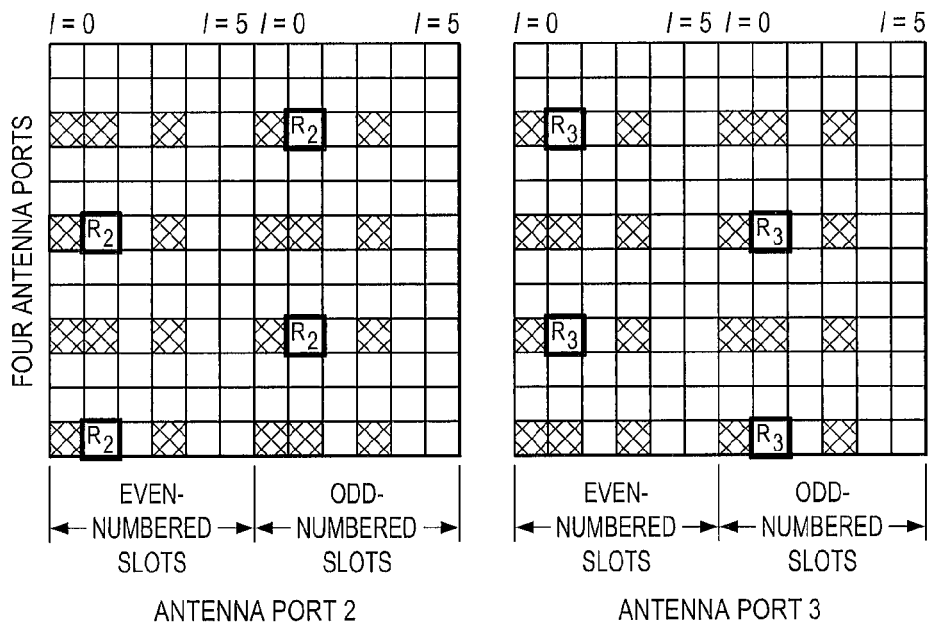

FIGS. 5 and 6 illustrate the resource elements used for reference signal transmission. FIG. 5 illustrates a first resource element configuration 500 and FIG. 6 illustrates a second resource element configuration 600. The notation $R_p$ is used to denote a resource element used for reference signal transmission on antenna port $^p$.

Figure 7:
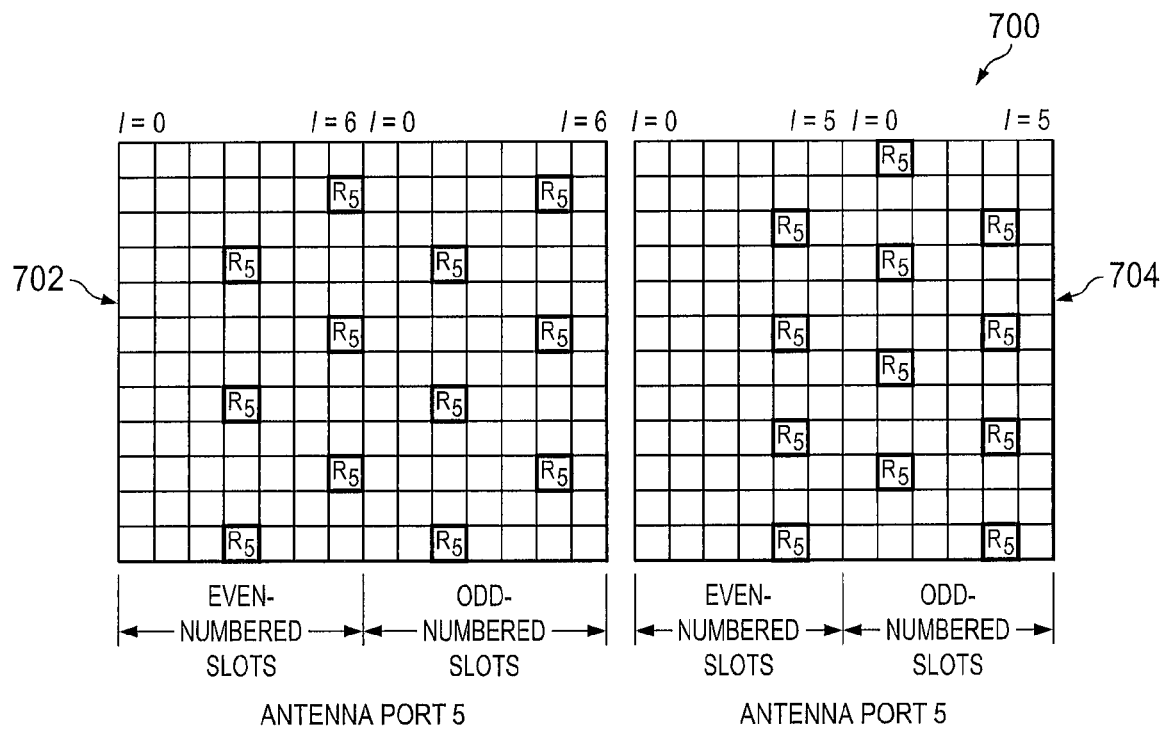
FIG. 7 illustrates the resource elements used for UE-specific reference signals for normal cyclic prefix and for extended cyclic prefix according to an exemplary embodiment of the disclosure.

UE-specific reference signals (or dedicated RS: DRS) are supported for single-antenna-port transmission of PDSCH and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped. FIG. 7 illustrates the resource elements 700 used for UE-specific reference signals for normal cyclic prefix 702 and for extended cyclic prefix 704.

Figure 8:
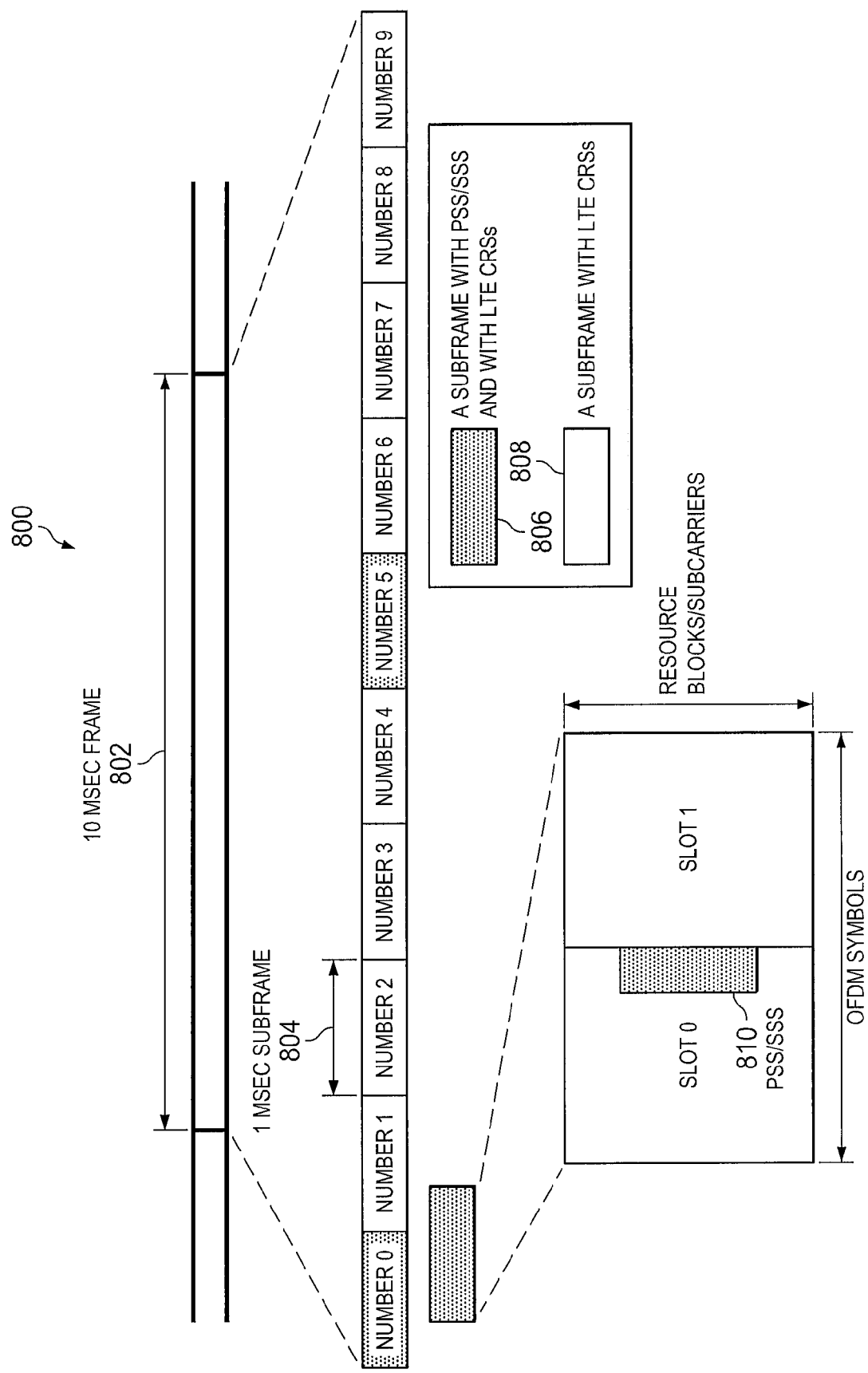
FIG. 8 illustrates the subframe partition of the LTE system and is depicted according to an exemplary embodiment of the disclosure.

In FIG. 8, the subframe partition 800 of the LTE system is depicted. The time resources are partitioned into ten msec frames 802, and each frame is further partitioned into ten subframes of one msec duration each. These ten subframes are labeled as #0, #1, #2, #3, #4, #5, #6, #7, #8, and #9. It is understood that each subframe is divided into two time slots, each of which spans 0.5 msec. A slot has seven OFDM symbols in a normal cyclic-prefix (CP) subframe, while a slot has six OFDM symbols in an extended CP subframe.

A subframe is partitioned in the frequency domain into multiple resource blocks (RBs), where an RB is composed of 12 subcarriers. The CRSs mapped for antenna ports 0, 1, 2 and 3 are transmitted in the RBs in all these 10 subframes. The primary synchronization signal (PSS) and secondary synchronization signal (SSS) 810 are transmitted in the last two OFDM symbols 806 in the first slot in subframes #0 and #5 using a subset of consecutive subcarriers located in the center of the system bandwidth. Subframes with LTE CRSs 808 are also shown in FIG. 8.

It is understood that the LTE system may map various elements, including CRSs, using a mapping scheme. The phrase mapping scheme is intended to refer to any scheme which may be used to map elements, such CRSs, into a RB. While the LTE system is discussed herein, it is expressly contemplated that any scheme may be used.

One design consideration of an LTE-A system is the advantages of maintaining backward compatibility. The phrase backward compatibility is intended to refer to the ability of LTE user equipment (UE) to operate in LTE-A system, while still satisfying the LTE performance target. It is therefore understood that reference signal (RS) design in LTE-A system should be carefully done so that LTE-A UEs can fully exploit the new functionality, such as relaying, coordinated multipoint transmissions, and 8 transmit-antenna (8-Tx) multi-input-multi-output (MIMO) communications, without unnecessary impact on the LTE UEs throughput performance.

In one embodiment of this disclosure, new sets of RSs for the 8-Tx transmissions in LTE-A are defined. As in LTE, the new sets of RSs are classified as cell-specific RSs (or common RS, CRS) and UE-specific RSs (or dedicated RS, DRS). DL CRSs can be accessed by all the UEs within the cell which the eNodeB covers regardless of specific time/frequency resource allocation to UEs. DL CRSs can be used both for CQI/PMI/RI measurement and demodulation at a UE. On the other hand, DL DRSs are transmitted by the eNodeB only within such resource blocks in which a subset of UEs in the cell are allocated to receive the DL packet, and are accessed only by the subset of UEs.

In one embodiment of this disclosure, new four sets of RSs (NRSs) are mapped onto REs in a resource block in a normal cyclic-prefix (NCP) subframe and in an extended cyclic-prefix (ECP) subframe. These four sets of NRSs can be used either as the sets of CRSs and as the sets of DRSs, or both.

At an RS RE, only one antenna port indicated by the number label on the time-frequency tile is turned on, while the other three are turned off. The RS REs for an antenna port have a staggered pattern in the time and frequency grid. The staggered pattern is intended for improving the frequency resolution of the estimated channel. In addition, the RS REs in an OFDM symbol are spaced apart by having a few data REs between two consecutive RS REs so that cell-specific frequency shifting can be used for interference management.

When cell-specific frequency shifting is applied, the subcarrier indices at RS REs may circularly shift by an integer number.

In one method, referred herein as RS-RE Mapping Method A, each antenna port's RSs are mapped onto two RS REs in a resource block spanning one subframe, and these 8 RS symbols for the four antenna ports are mapped onto a subset of REs in two OFDM symbols. The RS REs in an OFDM symbol are spaced apart by two data REs between two consecutive RS REs; with this RS-RE spacing, four RS REs can be assigned in an OFDM symbol in a resource block having twelve REs.

These two OFDM symbols are selected among the OFDM symbols whose REs do not have LTE CRS REs. The OFDM symbol indices in the two slots composing one subframe satisfying this condition according to the LTE specification are 2, 3, 5 and 6 in both slots of a normal CP subframe, and are 2, 4 and 5 in both slots of a extended CP subframe. It is further understood that these two OFDM symbols may or may not have LTE DRS REs.

It is understood that the last two OFDM symbols in time slot 1 in a subframe for NRS mapping may be optionally chosen. When the last two OFDM symbols are not chosen for the purpose of avoiding RE-collision in RBs in subframes where PSS/SSS are transmitted, then only OFDM symbols 2 and 3 are available for NRS mapping in slot 1 of a normal cyclic-prefix subframe, and only OFDM symbol 2 is available in slot 1 of an extended cyclic-prefix subframe.

NRS elements associated with antenna ports 4, 5, 6 and 7 are mapped onto the four RS REs in an OFDM symbol in a resource block either in the order of (7, 6, 5, 4) or in the order of (5, 4, 7, 6) from one edge to the other. Doing such a mapping, at an RE associated with physical antenna port 5, for example, the power on the physical antenna port 5 may be boosted by a plurality of times, by pulling power unused in the other three RS REs in the same OFDM symbol, since physical antenna port 5 does not transmit signals at RS REs associated with physical antenna ports 4, 6 and 7 in the same OFDM symbol. It is understood that this boost may result in at least a four fold increase in the power on the physical antenna port in some embodiments.

The subcarrier indices on which the NRS REs are located in the two OFDM symbols can be either the same as or different from those on which the CRS REs in LTE are located.

Figure 9:
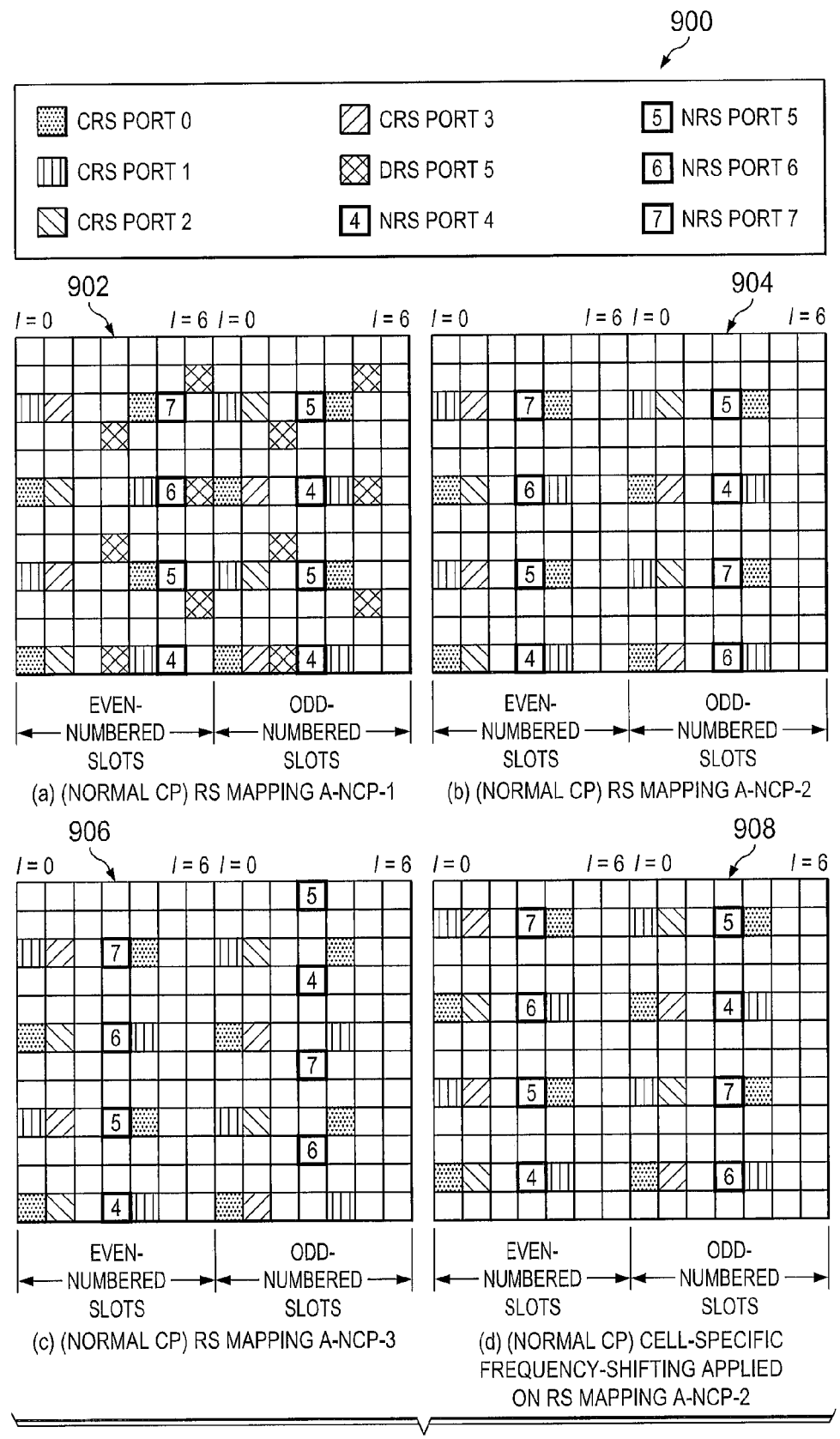
FIG. 9a illustrates an example of NRS mappings using RS-RE mapping A-NCP-1 constructed according to an exemplary embodiment of the disclosure.
FIG. 9b illustrates an example of NRS mappings using RS-RE mapping A-NCP-2 constructed according to an exemplary embodiment of the disclosure.
FIG. 9c illustrates an example of NRS mappings using RS-RE mapping A-NCP-3 constructed according to an exemplary embodiment of the disclosure.
FIG. 9d illustrates an example of NRS mappings using RS-RE mapping A-NCP-4 constructed according to an exemplary embodiment of the disclosure.
Figure 10:
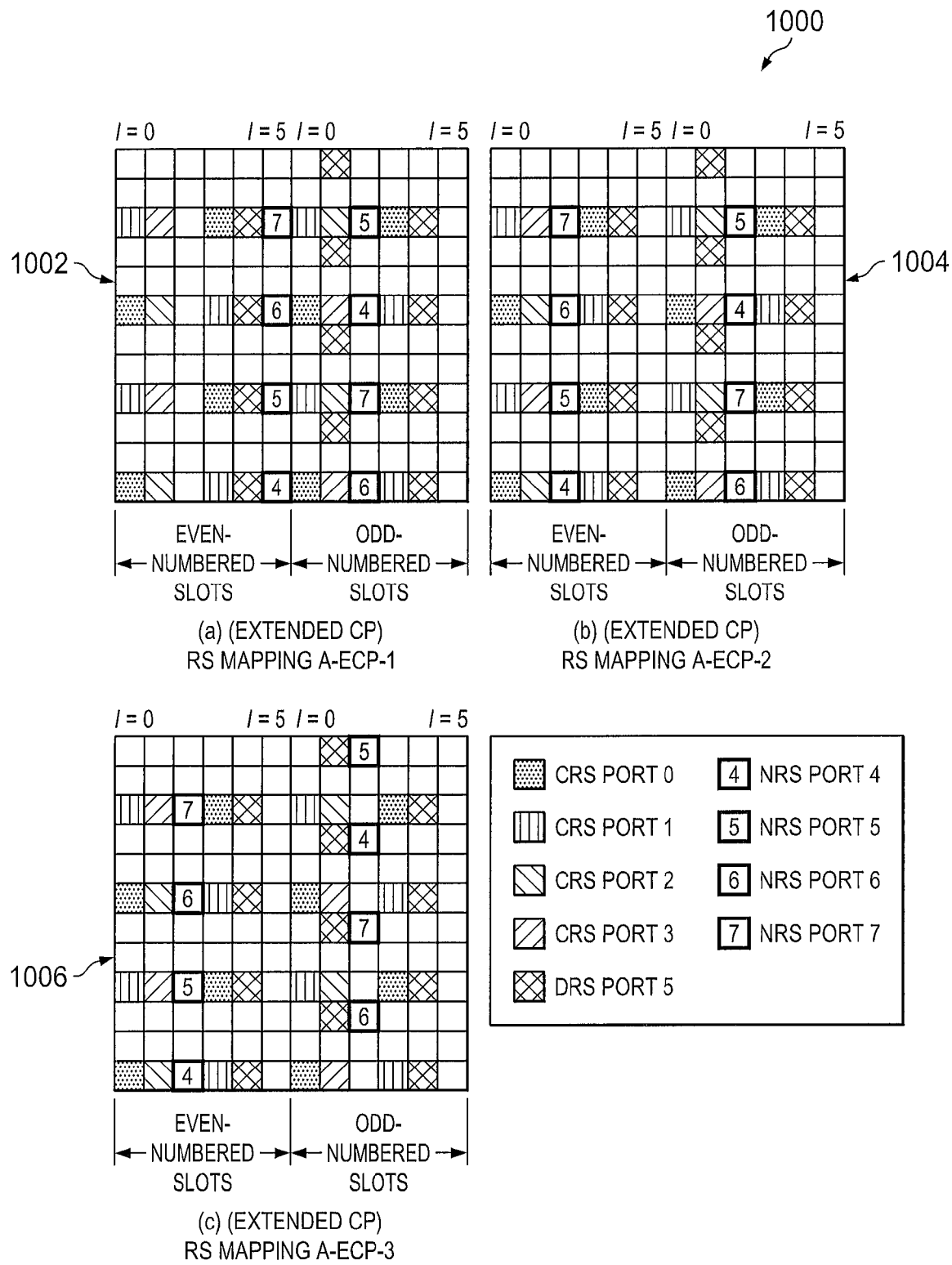
FIG. 10a illustrates an example of NRS mappings using RS-RE mapping A-ECP-1 constructed according to an exemplary embodiment of the disclosure.
FIG. 10b illustrates an example of NRS mappings using RS-RE mapping A-ECP-2 constructed according to an exemplary embodiment of the disclosure.
FIG. 10c illustrates an example of NRS mappings using RS-RE mapping A-ECP-3 constructed according to an exemplary embodiment of the disclosure.

Examples of NRS mappings constructed according to the principles of RS-RE Mapping Method A are depicted in FIG. 9 and FIG. 10.

FIG. 9 illustrates four mappings 900 including FIG. 9(a) showing a normal CP RS mapping A-NCP-1 902, FIG. 9(b) showing a normal CP RS mapping A-NCP-2 904, FIG. 9(c) showing a normal CP RS mapping A-NCP-3 906, and FIG. 9(d) showing a normal CP RS mapping A-NCP-2 1108.

FIG. 10 illustrates three mappings 1000 including FIG. 10(a) showing an extended CP RS mapping A-ECP-1 1002, FIG. 10(b) showing an extended CP RS mapping A-ECP-2 1004, and FIG. 10(c) showing an extended CP RS mapping A-ECP-3 1006.

In A-NCP-1 in FIG. 9(a) and A-ECP-1 in FIG. 10(a), OFDM symbol 5 in subframe 1 and OFDM symbol 3 in subframe 2 are used for the NRS mapping. The NRSs are mapped in the order of 7, 6, 5 and 4 from the top to the bottom in OFDM symbol 5 in subframe 1; the NRSs are mapped in the order of 5, 4, 7 and 6 in OFDM symbol 3 in subframe 2.

A-NCP-2 in FIG. 9(b) uses different OFDM symbols for NRSs from A-NCP-1, and the NRSs in A-NCP-2 do not collide with PSS/SSS signals in these resource blocks in subframes in which PSS/SSS are transmitted. Likewise, A-ECP-2 in FIG. 10(b) uses different OFDM symbols for NRSs from A-ECP-1, and the NRSs in A-ECP-2 do not collide with PSS/SSS signals in these resource blocks in subframes in which PSS/SSS are transmitted.

A-NCP-3 in FIG. 9(c) uses the same OFDM symbols as the A-NCP-2, while the NRSs in the second OFDM symbol (OFDM symbol 3 in slot 2) are mapped onto different subcarriers from the NRSs in the first OFDM symbol (OFDM symbol 3 in slot 1). Likewise, A-ECP-3 in FIG. 10(c) uses the same OFDM symbols as the A-ECP-2, while the NRSs in the second OFDM symbol (OFDM symbol 3 in slot 2) are mapped onto different subcarriers from the NRSs in the first OFDM symbol (OFDM symbol 3 in slot 1).

In FIG. 9(d), cell-specific frequency shifting is applied on A-NCP-2. The subcarrier indices for RS REs are circularly shifted by 1 from A-NCP-2.

A-NCP-1, A-ECP-1, A-ECP-2 and A-ECP-3 are examples where the OFDM symbols in which new sets of RSs are placed are chosen to avoid LTE DRSs.

In another method, referred to herein as RS-RE Mapping Method B, each antenna port's RSs are mapped onto four RS REs in a resource block spanning one subframe, and these 16 RS symbols for the four antenna ports are mapped onto a subset of REs in four OFDM symbols. The RS REs in an OFDM symbol are spaced apart by two data REs between two consecutive RS REs; with this RS-RE spacing, four RS REs can be assigned in an OFDM symbol in a resource block having twelve REs. Detailed construction principles follows:

These four OFDM symbols are selected among the OFDM symbols whose REs do not have LTE CRS REs. The OFDM symbol indices in the two slots composing one subframe satisfying this condition according to the LTE specification are 2, 3, 5 and 6 in both slots of a normal CP subframe, and are 2, 4 and 5 in both slots of a extended CP subframe. These two OFDM symbols may or may not have LTE DRS REs.

The last two OFDM symbols in time slot 1 in a subframe for NRS mapping may be optionally chosen. When the last two OFDM symbols are not chosen for the purpose of avoiding RE-collision in RBs in subframes where PSS/SSS are transmitted, then only OFDM symbols 2 and 3 are available for NRS mapping in slot 1 of a normal cyclic-prefix subframe, and only OFDM symbol 2 is available in slot 1 of an extended cyclic-prefix subframe.

Referring now to the four RS REs in an OFDM symbol in a resource block, either two or four sets of RSs can be mapped. When two sets of RSs are mapped onto the four RS REs in an OFDM symbol, the RS elements are mapped in the order of (5, 4, 5, 4), (4, 5, 4, 5), (7, 6, 7, 6), or (6, 7, 6, 7) from one edge to another. When four sets of RSs are mapped onto the four RS REs in an OFDM symbol, the RS elements are mapped in the order of any 24 (=4!) permutation of (4, 5, 6, 7) from one edge to the other. For example, the permutation can be (4, 5, 6, 7), (6, 7, 4, 5), (4, 5, 6, 7) or (5, 4, 7, 6).

The subcarrier indices on which the NRS REs are located in the four OFDM symbols can be either the same as or different from those on which the CRS REs in LTE are located.

Figure 11:
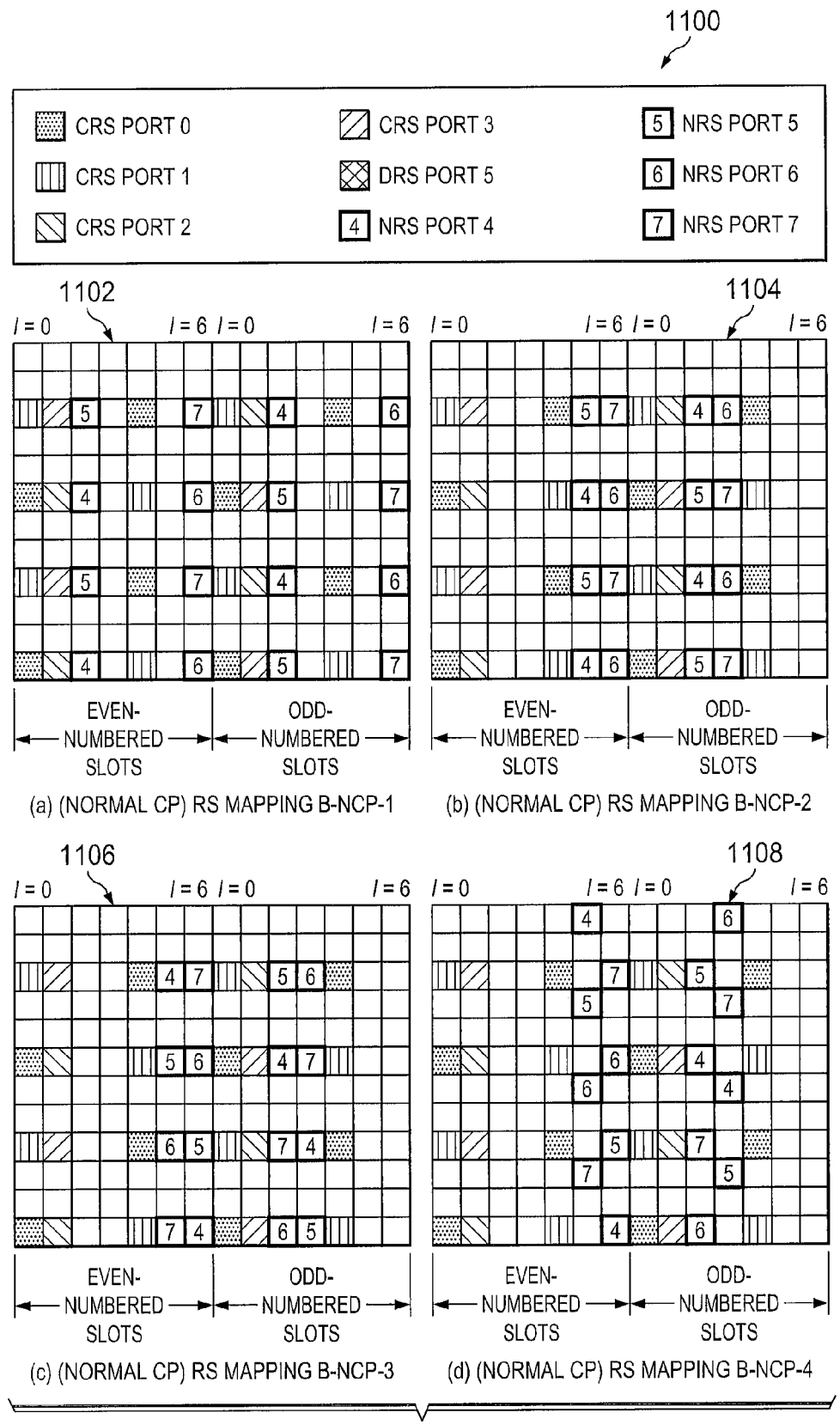
FIG. 11a illustrates an example of NRS mappings using RS-RE mapping B-NCP-1 constructed according to an exemplary embodiment of the disclosure.
FIG. 11b illustrates an example of NRS mappings using RS-RE mapping B-NCP-2 constructed according to an exemplary embodiment of the disclosure.
FIG. 11c illustrates an example of NRS mappings using RS-RE mapping B-NCP-3 constructed according to an exemplary embodiment of the disclosure.
FIG. 11d illustrates an example of NRS mappings using RS-RE mapping B-NCP-4 constructed according to an exemplary embodiment of the disclosure.
Figure 12:
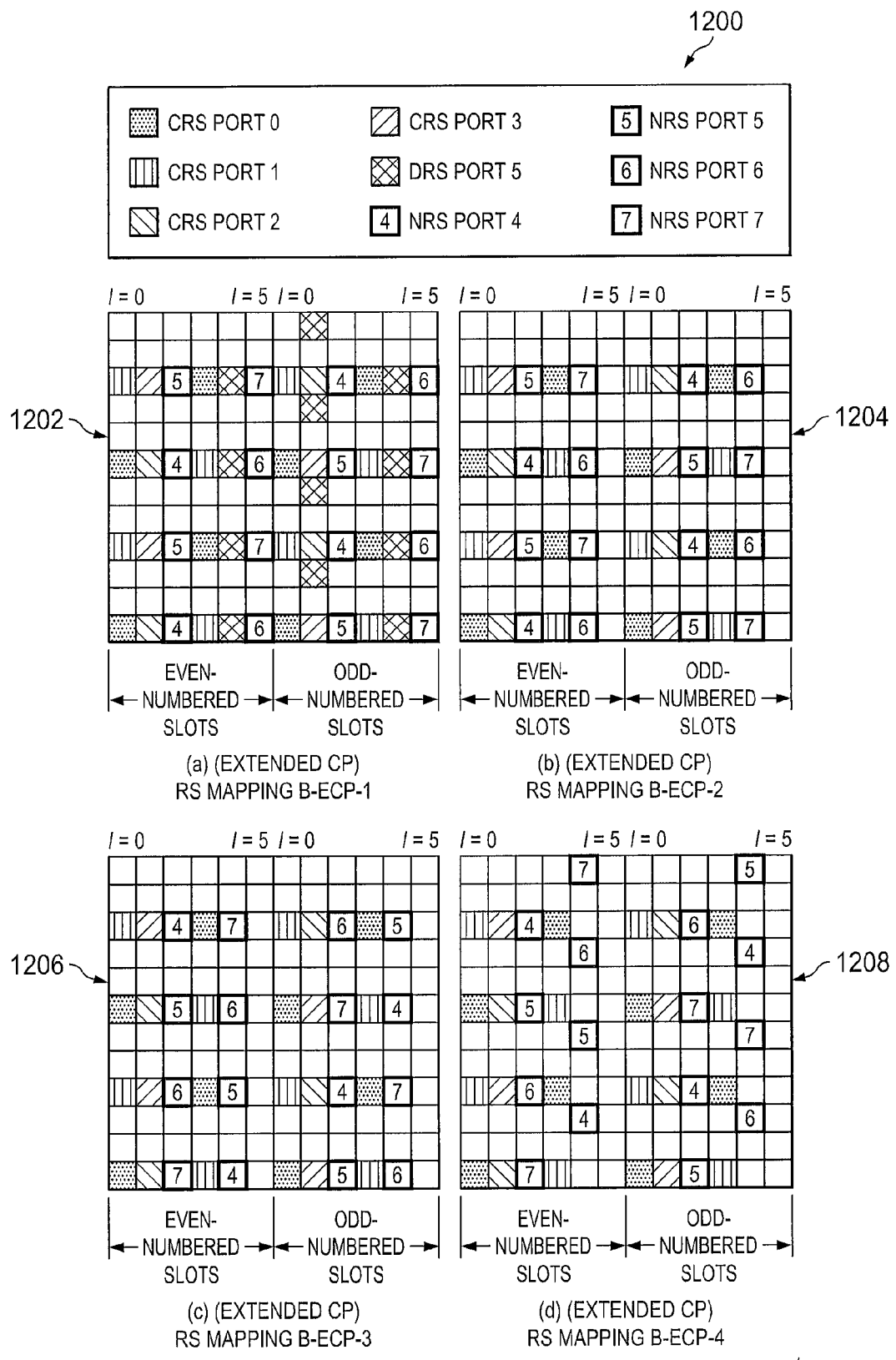
FIG. 12a illustrates an example of NRS mappings using RS-RE mapping B-ECP-1 constructed according to an exemplary embodiment of the disclosure.
FIG. 12b illustrates an example of NRS mappings using RS-RE mapping B-ECP-2 constructed according to an exemplary embodiment of the disclosure.
FIG. 12c illustrates an example of NRS mappings using RS-RE mapping B-ECP-3 constructed according to an exemplary embodiment of the disclosure.
FIG. 12d illustrates an example of NRS mappings using RS-RE mapping B-ECP-4 constructed according to an exemplary embodiment of the disclosure.

Examples of NRS mappings constructed according to the principles of RS-RE Mapping Method B are depicted in FIG. 11 and FIG. 12.

FIG. 11 illustrates four mappings 1100 including FIG. 11(a) showing a normal CP RS mapping B-NCP-1 1102, FIG. 11(b) showing a normal CP RS mapping B-NCP-2 1104, FIG. 11(c) showing a normal CP RS mapping B-NCP-3 1106, and FIG. 11(d) showing a normal CP RS mapping B-NCP-2 1108.

FIG. 12 illustrates four mappings 1200 including FIG. 12(*a*) showing an extended CP RS mapping B-ECP-1 1202, FIG. 12(*b*) showing an extended CP RS mapping B-ECP-2 1204, FIG. 12(*c*) showing an extended CP RS mapping B-ECP-3 1206, and FIG. 12(*d*) showing an extended CP RS mapping B-ECP-2 1208.

In B-NCP-1 in FIG. 11(*a*), OFDM symbols 2 and 6 in both slots are used for the NRS mapping. The NRSs are mapped in the order of (5, 4, 5, 4) from the top to the bottom in OFDM symbol 2 in slot 1, in the order of (7, 6, 7, 6) in OFDM symbol 6 in slot 1, in the order of (4, 5, 4, 5) in OFDM symbol 2 in slot 2, and in the order of (6, 7, 6, 7) in OFDM symbol 6 in slot 2. Likewise, in B-ECP-1 in FIG. 12(*a*), OFDM symbols 2 and 5 in both slots are used for the NRS mapping. The NRSs are mapped in the order of (5, 4, 5, 4) from the top to the bottom in OFDM symbol 2 in slot 1, in the order of (7, 6, 7, 6) in OFDM symbol 5 in slot 1, in the order of (4, 5, 4, 5) in OFDM symbol 2 in slot 2, and in the order of (6, 7, 6, 7) in OFDM symbol 5 in slot 2.

B-NCP-2 in FIG. 11(*b*) uses different OFDM symbols for NRSs from B-NCP-1, and the NRSs in B-NCP-2 do not collide with PSS/SSS signals in these resource blocks in subframes in which PSS/SSS are transmitted. Likewise, B-ECP-2 in FIG. 12(*b*) uses different OFDM symbols for NRSs from B-ECP-1.

B-NCP-3 in FIG. 11(*c*) uses the same OFDM symbols as the B-NCP-2, while the NRS mapping method is different in each OFDM symbol. Now, the NRSs are mapped in the order of (4, 5, 6, 7) from the top to the bottom in OFDM symbol 5 and (7, 6, 5, 4) in slot 1, and in the order of (5, 4, 7, 6) in OFDM symbol 2 and (6, 7, 4, 5) in OFDM symbol 3 in slot 2. Likewise, B-ECP-3 in FIG. 12(*c*) uses the same OFDM symbols as the B-ECP-2, while the NRS mapping method is different in each OFDM symbol.

B-NCP-4 in FIG. 11(*d*) uses the same OFDM symbols as the B-NCP-3, while the NRSs in the first and the fourth OFDM symbols (OFDM symbol 5 in slot 1 and OFDM symbol 2 in slot 2) are mapped onto different subcarriers from the NRSs in the second and the third OFDM symbols (OFDM symbol 6 in slot 1 and OFDM symbol 3 in slot 2). Likewise, B-ECP-4 in FIG. 12(*d*) uses the same OFDM symbols as the B-ECP-3, while the NRSs in the second and the fourth OFDM symbols (OFDM symbol 4 in both slots) are mapped onto different subcarriers from the NRSs in the first and the third OFDM symbols (OFDM symbol 2 in both slots).

In another method, herein referred to as RS-RE Mapping Method C, each antenna port's RSs are mapped onto three RS REs in a resource block spanning one subframe, and these 12 RS symbols for the four antenna ports are mapped onto a subset of REs in three OFDM symbols. The RS REs in an OFDM symbol are spaced apart by three data REs between two consecutive RS REs; with this RS-RE spacing, three RS REs can be assigned in an OFDM symbol in a resource block having twelve REs.

In RS-RE Mapping Method C, three OFDM symbols are selected among the OFDM symbols whose REs do not have LTE CRS REs. The OFDM symbol indices in the two slots composing one subframe satisfying this condition according to the LTE specification are 2, 3, 5 and 6 in both slots of a normal CP subframe, and are 2, 4 and 5 in both slots of a extended CP subframe.

Also in RS-RE Mapping Method C, these two OFDM symbols may or may not have LTE DRS REs.

It is understood that it may be optional to chose the last two OFDM symbols in time slot 1 in a subframe for NRS mapping. When the last two OFDM symbols are not chosen for the purpose of avoiding RE-collision in RBs in subframes where PSS/SSS are transmitted, then only OFDM symbols 2 and 3 are available for NRS mapping in slot 1 of a normal cyclic-prefix subframe, and only OFDM symbol 2 is available in slot 1 of an extended cyclic-prefix subframe.

It is understood that, either two or four sets of RSs can be mapped onto the three RS REs in an OFDM symbol in a resource block. In an OFDM symbol, the RS elements are mapped in the order obtained from any permutation of (4, 5, 6), (5, 6, 7), (4, 5, 7), (4, 6, 7) from one edge to the other. For example, the permutation can be (6, 5, 4), (5, 4, 7), (4, 7, 6) or (7, 6, 5).

The subcarrier indices on which the NRS REs are located in the four OFDM symbols can be either the same as or different from those on which the CRS REs in LTE are located.

Figure 13:
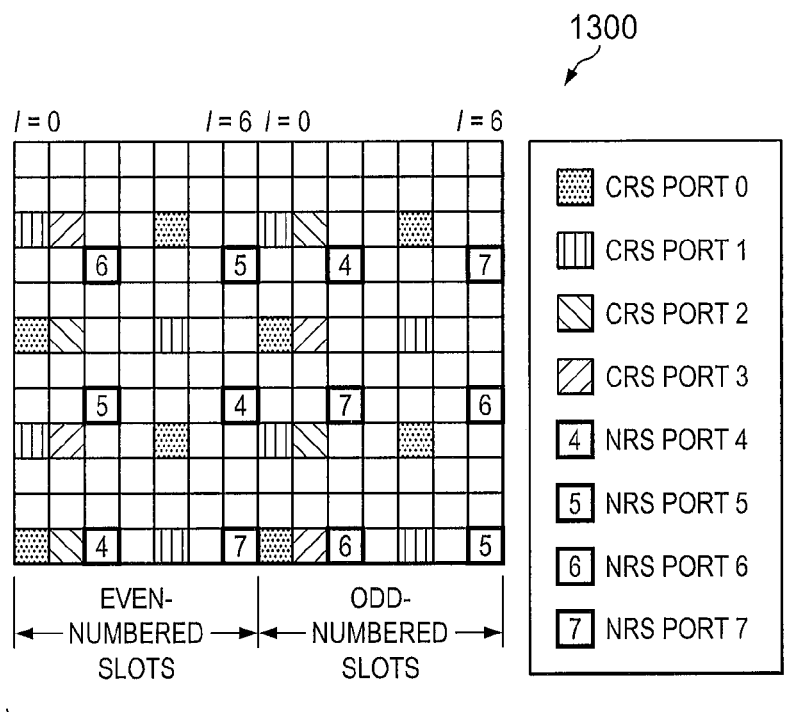
FIG. 13 is an example of NRS mapping constructed according to the principles of RS-RE Mapping Method C according to an exemplary embodiment of the disclosure.

An example of NRS mapping constructed according to the principles of RS-RE Mapping Method C 1300 is depicted in FIG. 13.

In C-NCP-1 in FIG. 13, OFDM symbols 2 and 6 in both slots are used for the NRS mapping. The NRSs are mapped in the order of (6, 5, 4) from the top to the bottom in OFDM symbol 2 in slot 1, in the order of (5, 4, 7) in OFDM symbol 6 in slot 1, in the order of (4, 7, 6) in OFDM symbol 2 in slot 2, and in the order of (7, 6, 5) in OFDM symbol 6 in slot 2.

As in the examples for RS-RE-Mapping Methods A and B shown in FIG. 9, FIG. 10, FIG. 11 and FIG. 12, other variants can be constructed utilizing the principles of RS-RE Mapping method C, both in normal-CP and extended-CP subframes.

In one embodiment of this disclosure, the four sets of NRSs, whose example mapping methods are depicted in FIG. 9, FIG. 10, FIG. 11, FIG. 12 and FIG. 13, are utilized as the four new sets of CRSs for antenna ports 5, 6, 7 and 8.

It is explicitly understood that particular patterns may be used for mapping. One example of this type of mapping is to stagger the various elements, such as reference signal symbols. This staggering is intended to refer to any distribution of reference signal symbols within a resource block. One example of this staggering using is where the staggering positions of the reference signal symbols of each of the first number of new antenna ports are mapped in the order of 4, 3, 2 and 1 to the selected subcarriers in a first OFDM symbol of the second number of OFDM symbols, and in the order of 2, 1, 4 and 3 to the subcarriers in a second OFDM symbol of the second number of OFDM symbols; wherein the first number is four, and the first number of new antenna ports are referred to as antenna ports 1, 2, 3 and 4.

The new sets of CRSs can be used either for CQI/PMI/RI measurement or for demodulation at a UE, or for both. The new sets of CRSs are transmitted by eNodeB either at every subframe, or every once in a while either periodically or non-periodically. Within these sets of subframes, the new sets of CRSs are transmitted by eNodeB either in all the resource blocks (RBs) over the entire bandwidth, or only in a subset of the RBs.

The new sets of CRSs are transmitted by eNodeB so that they do not collide the primary synchronization signal (PSS) and the secondary synchronization signal (SSS) defined in LTE. In one method, eNodeB conFIGUREs that the new sets of RSs are transmitted in such subframes where PSS and SSS are not transmitted. In another method, eNodeB conFIGUREs that the new sets of RSs are not transmitted in the RBs where PSS and SSS are transmitted in these subframes in which PSS and SSS are transmitted.

In FIG. 14, two examples of mapping the new sets of CRSs is described. In the first mapping example 1402, the new sets of CRSs are transmitted in #1 and #6, or every fifth subframe beginning from #1, in addition to the existing sets of CRSs in LTE. In the other subframes, only the sets of CRSs defined in LTE are transmitted. In the second mapping example 1404, the new sets of CRSs are periodically transmitted in every fourth subframe. In the frame shown in the FIGURE, subframes #1, #5 and #9 are used for the new sets. In particular, in subframe #5, both PSS/SSS and the new sets of CRSs coexist. In one example, the new sets of CRSs can be transmitted only in the resource blocks in which PSS/SSS are not allocated. In another example, provided that the new sets of CRSs are mapped in such a way that the new RS REs do not collide with the REs used for PSS/SSS (for example, RS mapping A-NCP-1 and A-ECP-1), then the new sets of CRSs can be transmitted in all the resource blocks in subframe #5.

In one embodiment of this disclosure, one mapping of the four sets of NRSs, whose example mapping methods are depicted in FIG. 9, FIG. 10, FIG. 11 and FIG. 12, is utilized as the four new sets of CRSs in a subframe, while another mapping of the four sets of NRSs is utilized as the four new sets of DRSs in another subframe. The RS RE mapping methods used for the new sets of CRSs and for the new sets of DRSs can be either the same or different from each other.

The new sets of DRSs are transmitted only in the allocated RBs to a UE, and are used for demodulation at the UE.

One example of new CRS and new DRS placement in subframes is shown in FIG. 15. In subframe #1 and #6, new sets of CRSs mapped by B-NCP-1 are transmitted together with the LTE CRSs. On the other hand, on subframe #4 and #7, new sets of DRSs mapped by B-NCP-3 are transmitted in some RBs, together with LTE CRSs in all the RBs.

It is understood that the new sets of DRSs can be either preceded or non-preceded.

When the new sets of DRSs are not preceded, the DRSs for antenna ports 4, 5, 6 and 7 may correspond to physical antenna ports 4, 5, 6 and 7. The demodulation in the 8-Tx transmission can be done by utilizing the channel estimates obtained through all the 8 sets of RSs and the precoding vector information available at the UE.

The UE may obtain the precoding vector information via a special DL control message sent by eNodeB with DL scheduling grant.

When the new sets of DRSs are preceded, the DRSs for antenna ports 4, 5, 6 and 7 may correspond to streams 0, 1, 2 and 3 of up to rank-4 transmissions. In other words, each set of the DRSs is precoded according to the precoding vector associated with a stream, up to rank-4 transmissions. Up to rank 4 transmissions, the precoding vectors can be either shared or not-shared between the eNodeB and the UE. When the transmission rank is strictly less than four, only the DRS sets associated with "rank" number of streams may be transmitted. The REs mapped for the other DRS sets can be utilized as data REs.

For transmissions with from rank-5 up to rank-8 transmissions, the precoding vectors for the first four streams are assumed to be known both at the eNodeB and at the UE. Then, the UE can calculate the channel gains of physical antenna ports 0, 1, 2, ..., 7 by solving the linear system of equations, since the channel gains for physical antenna ports 0, 1, 2 and 3 can be estimated by the RSs defined in LTE system and four additional precoded channel gain estimates are available through the new four sets of the DRSs. The UE may use these 8 estimated channels for the demodulation. The procedure for demodulation of the streams in transmissions with a rank larger than 4 using these sets of new DRSs and LTE CRSs is described in FIG. 16.

Figure 16:
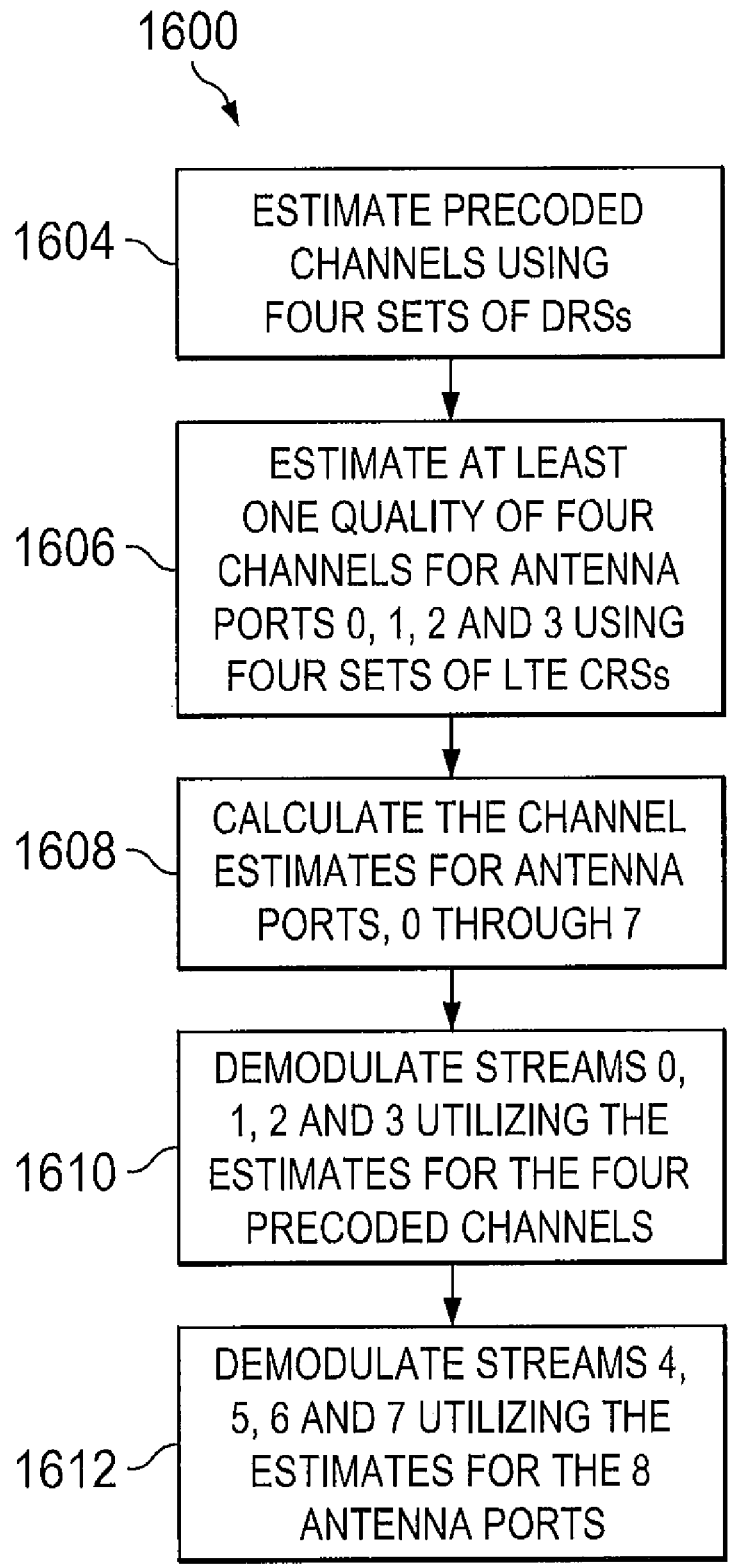
FIG. 16 is a flowchart illustrating the demodulation of streams in transmission with a rank larger than 4 with a new set of DRSs and LTE CRSs according to an exemplary embodiment of the disclosure.

FIG. 16 shows a flowchart 1600 illustrating one embodiment of a procedure for demodulation of the streams in transmissions with a rank larger than 4 using these sets of new DRSs and LTE CRSs. In block 1604, information related to the precoded channels using four sets of DRSs is estimated. This information may related to the channel gain for at least some of the preceded channels. In block 1606, the four channels for the antenna ports 0, 1, 2, and 3 are estimated using the four sets of LTE CRSs. In block 1608, four precoding vectors are utilized for the DRSs and the 8 estimated channels to calculate the channel estimates for antenna ports 0 through 7. In block 1610, the streams 0, 1, 2 and 3 are demodulated utilizing the estimates for the four precoded channels. In block 1612, the streams 4, 5, 6 and 7 are demodulated utilizing the estimates for the 8 antenna ports.

Figure 17:
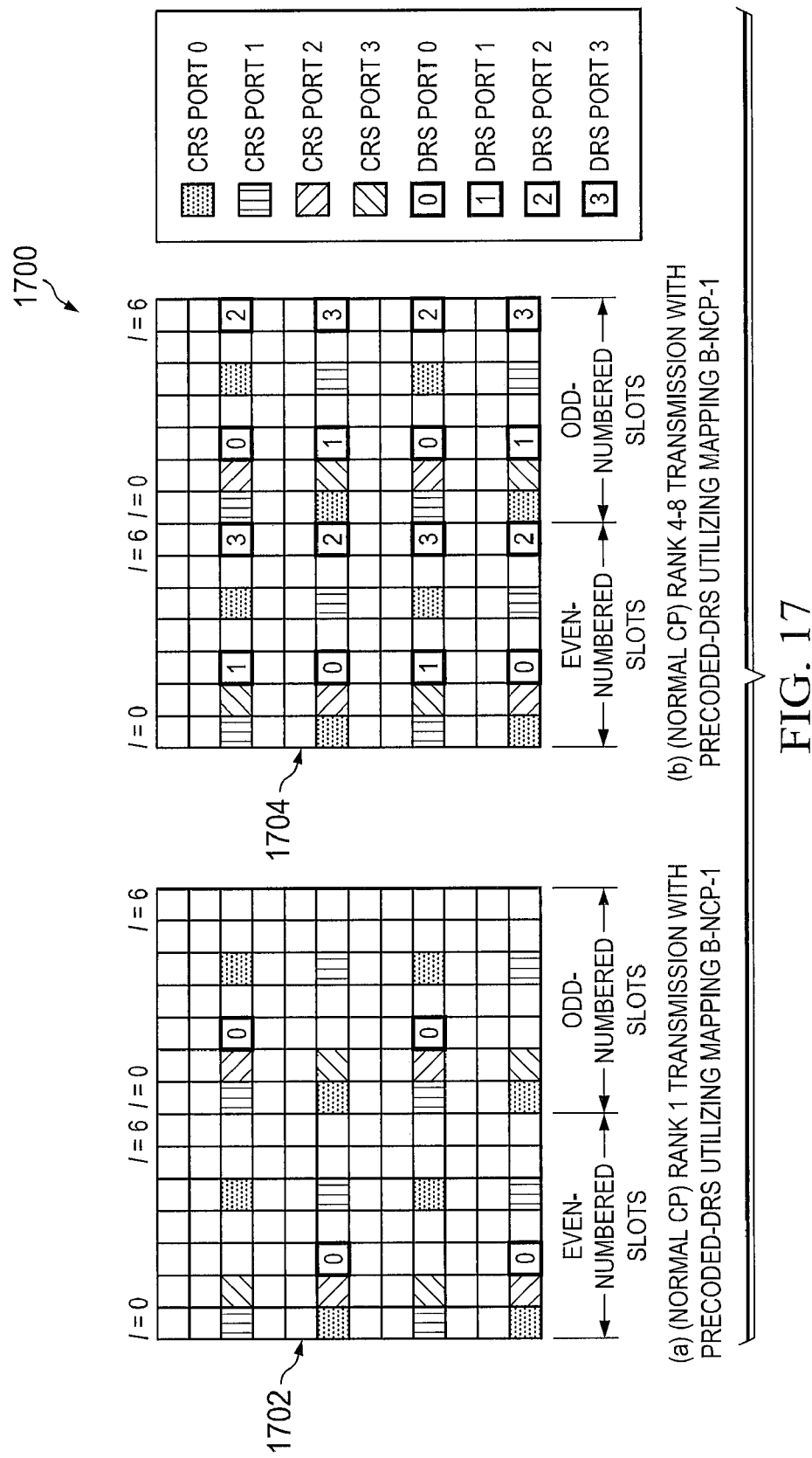
FIG. 17a is an example where a normal CP subframe has both sets of precoded DRSs and LTE CRSs according to an exemplary embodiment of the disclosure.
FIG. 17b is an example of an RB in a normal CP subframe which has four sets of preceded DRS for stream 0, based on NRS mapping B-NCP-1 and LTE CRSs, which can be used for rank 4-8 transmissions according to an exemplary embodiment of the disclosure.

FIG. 17 shows examples 1700 where a normal CP subframe has both sets of precoded DRSs and LTE CRSs. In FIG. 17(*a*) mapping 1702, an RB in a normal CP subframe has one set of precoded DRS for stream 0, based on NRS mapping B-NCP-1 and LTE CRSs, which can be used for rank 1 transmissions. The set of preceded DRSs for stream 0 can be utilized for demodulation of stream 0.

For example, the precoding vector for DRS stream 0 is [1 1 1 1 1 1 1 1]; then each of the transmit antennas transmit its own RS symbol multiplied by 1 in DRS REs labeled as DRS for stream 0. In the data REs where no RSs are mapped, a data stream is precoded by the same precoding vector; each of the transmit antennas transmit a data symbol in the data stream multiplied by 1. For demodulation of the data stream, the estimated channel obtained from the preceded DRS is utilized.

In FIG. 17(*b*) mapping 1704, an RB in a normal CP subframe has four sets of precoded DRS for stream 0, based on NRS mapping B-NCP-1 and LTE CRSs, which can be used for rank 4-8 transmissions. The NRSs port 4, 5, 6 and 7 are now relabeled as DRS for streams 0, 1, 2 and 3. Each set of precoded DRSs can be utilized for modulation of a stream up to rank-4 transmissions.

For example, the preceding vector for DRS stream 0 is [1 1 1 1 1 1 1 1], for DRS stream 1 [1 −1 1 −1 1 −1 1 −1], for DRS stream 2 [1 −1 −1 1 1 −1 −1 1], and for DRS stream 3 is [1 1 −1 −1 1 1 −1 −1]. Then, at an RE at an receive antenna, the estimated channels utilizing each set of RSs can be written as in the following (here, $h_0$, $h_1$, $h_2$, $h_3$, $h_4$, $h_5$, $h_6$, $h_7$ are the channels for antenna ports 0,1,2,3,4,5,6,7 respectively):

Utilizing CRS 0, channel $h_0$ is estimated.
Utilizing CRS 1, channel $h_1$ is estimated.
Utilizing CRS 2, channel $h_2$ is estimated.
Utilizing CRS 3, channel $h_3$ is estimated.
Utilizing DRS 0, channel $g_0 = h_0 + h_1 + h_2 + h_3 + h_4 + h_5 + h_6 + h_7$ is estimated.
Utilizing DRS 1, channel $g_1 = h_0 - h_1 + h_2 - h_3 + h_4 - h_5 + h_6 - h_7$ is estimated.
Utilizing DRS 2, channel $g_2 = h_0 - h_1 - h_2 + h_3 + h_4 - h_5 - h_6 + h_7$ is estimated.
Utilizing DRS 3, channel $g_3 = h_0 + h_1 - h_2 - h_3 + h_4 + h_5 - h_6 - h_7$ is estimated.

Then, the channels for antenna ports 4,5,6,7 can be calculated by the following set of relations:

$$h_4 = (g_0 + g_1 + g_2 + g_3 - 4h_0)/4.$$

$$h_5 = (g_0 - g_1 - g_2 + g_3 - 4h_1)/4.$$

$$h_6 = (g_0 + g_1 - g_2 - g_3 - 4h_2)/4.$$

$$h_7 = (g_0 - g_1 + g_2 - g_3 - 4h_3)/4.$$

Having channel estimates $h_0$, $h_1$, $h_2$, $h_3$, $h_4$, $h_5$, $h_6$, $h_7$ and the 4 precoding vectors for streams 4,5,6,7, these streams can be demodulated at the receiver.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of mapping reference signals for antenna ports in a plurality of resource blocks within an orthogonal frequency division multiplexing (OFDM) communication system, the method comprising:
   selecting a plurality of resource elements for transmitting in the plurality of resource blocks using a first number of antenna ports, wherein the first number of antenna ports are used to transmit a first number of reference signals using at least one specified mapping scheme, and wherein the resource elements comprise a first number of OFDM symbols that are transmitted using the first number of antenna ports;
   estimating, at a receiver, the first number of OFDM symbols to obtain a plurality of preceding vectors;
   selecting a second number of antenna ports; and
   mapping a plurality of reference signals relating to the second number of antenna ports using a second number of OFDM symbols, wherein each of the reference signals for the second number of antenna ports are mapped in one of the resource elements comprising each of the second number of OFDM symbols; and
   estimating the second number of OFDM symbols transmitted from the second number of antenna ports using the precoding vectors from the first number of OFDM symbols that were transmitted from the first number of antenna ports.

2. The method of claim 1, further comprising selecting the at least one predetermined resource element is selected according to at least one Long Term Evolution (LTE) standard.

3. The method of claim 1, further comprising staggering a position of reference signal symbols of each of the second number of antenna ports in a subcarrier domain and in an OFDM-symbol domain.

4. The method of claim 3, wherein the second number of antenna ports comprises an even number.

5. The method of claim 3, wherein the staggering comprises mapping the reference signal symbols in identical subcarriers of each of the second number of OFDM symbols.

6. The method of claim 3, wherein the staggering comprises mapping reference signal symbols in different subcarriers, wherein position differences are identical among the subcarriers including reference signals in each of the second number of OFDM symbols.

7. The method of claim 5, wherein a number of the identical subcarriers is less than or equal to the second number of reference signals.

8. The method of claim 1, wherein the method is performed in subframes not comprising synchronization signals.

9. The method of claim 1, wherein the method is performed in resource blocks not comprising synchronization signals.

10. A system comprising:
    a processor configured to map a plurality of reference signals for a number of antenna ports in a plurality of resource blocks within an orthogonal frequency division multiplexing (OFDM) communication system, the processor further configured to:
    select resource elements for transmitting in the plurality of resource blocks using a first number of antenna ports, wherein the first number of antenna ports are used to transmit a first number of the reference signals using at least one specified mapping scheme, and wherein resource elements comprises a first number of OFDM symbols that are transmitted using the first number of antenna ports;
    estimate the first number of OFDM symbols to obtain a plurality of precoding vectors;
    select a second number of antenna ports; and
    map a second number of the reference signals relating to the second number of antenna ports using a second number of OFDM symbols, wherein the reference signals for the second number of antenna ports are mapped in the resource elements comprising each of the second number of OFDM symbols;
    estimate the second number of OFDM symbols transmitted from the second number of antenna ports using the precoding vectors from the first number of OFDM symbols that were transmitted from the first number of antenna; and
    a transmitter configured to transmit the signals created by the processor over the plurality of antenna ports.

11. The system of claim 10, wherein the resource elements are selected according to at least one Long Term Evolution (LTE) standard.

12. The system of claim 10, wherein the processor is configured to stagger a position of reference signal symbols of each of the second number of antenna ports in a subcarrier domain and in an OFDM-symbol domain.

13. The system of claim 12, wherein the second number of antenna ports comprises an even number.

14. The system of claim 12, wherein the processor is configured to stagger the position of the reference signal symbols by mapping the reference signal symbols in identical subcarriers of each of the second number of OFDM symbols.

15. The system of claim 12, wherein the processor is configured to stagger the position of the reference signal symbols by mapping reference signal symbols in different subcarriers, wherein position differences are identical among the subcarriers including reference signals in each of the second number of OFDM symbols.

16. The system of claim 14, wherein a number of the identical subcarriers is less than or equal to the second number of reference signals.

17. The system of claim 10, wherein the processor is configured to select a first number of subcarriers, wherein the first number of subcarriers is greater than the first number of antenna ports.

18. The system of claim 16, wherein the processor is configured to map the first number of reference signals according to an LTE mapping scheme.

19. The system of claim 10, wherein the processor is configured to perform the selecting, estimating, selecting, mapping, and estimating in subframes not comprising synchronization signals.

20. The system of claim 10, wherein the processor is configured to perform the selecting, estimating, selecting, mapping, and estimating in resource blocks not comprising synchronization signals.

* * * * *